United States Patent
Li et al.

(10) Patent No.: US 12,486,749 B2
(45) Date of Patent: Dec. 2, 2025

(54) VARIABLE FREQUENCY DRIVE SYSTEM, VARIABLE FREQUENCY SPEED REGULATION INTEGRATED MACHINE, PUMP SYSTEM, AND WELL SITE LAYOUT

(71) Applicant: YANTAI JEREH PETROLEUM EQUIPMENT & TECHNOLOGIES CO., LTD., Shandong (CN)

(72) Inventors: Shouzhe Li, Shandong (CN); Jifeng Zhong, Shandong (CN); Liang Lv, Shandong (CN); Xincheng Li, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 133 days.

(21) Appl. No.: 18/455,217

(22) Filed: Aug. 24, 2023

(65) Prior Publication Data
US 2023/0412108 A1 Dec. 21, 2023

Related U.S. Application Data

(63) Continuation of application No. PCT/CN2022/125638, filed on Oct. 17, 2022.

(30) Foreign Application Priority Data

May 18, 2022 (CN) .......................... 202210539846.7

(51) Int. Cl.
*H02P 3/18* (2006.01)
*E21B 43/26* (2006.01)
(Continued)

(52) U.S. Cl.
CPC .......... *E21B 43/2607* (2020.05); *F04B 17/03* (2013.01); *H02P 27/08* (2013.01); *F04B 17/06* (2013.01)

(58) Field of Classification Search
CPC ........ H02P 27/085; H02P 27/14; H02P 25/18; H02P 25/184; H02P 27/08; H02K 7/1807; H02M 5/458; H02M 5/4585; H02M 7/797
See application file for complete search history.

(56) References Cited

U.S. PATENT DOCUMENTS

2006/0274560 A1* 12/2006 Rastogi ................ H02M 5/458
363/131
2017/0244325 A1 8/2017 Carralero et al.
(Continued)

FOREIGN PATENT DOCUMENTS

| CN | 2684460 Y | 3/2005 |
| CN | 2899282 Y | 5/2007 |

(Continued)

OTHER PUBLICATIONS

International Preliminary Report on Patentability Chapter I for International Application No. PCT/CN2022/125638 mailed on Nov. 28, 2024.
(Continued)

*Primary Examiner* — Muhammad S Islam
(74) *Attorney, Agent, or Firm* — Sheppard Mullin Richter & Hampton LLP

(57) ABSTRACT

The techniques disclosed herein reduce the withstand-voltage requirement on single power cell of a VFD (variable-frequency drive) system, and prevent the VFD system from stopping due to the damage of individual power cell in the VFD system. The VFD system includes: a motor; and a plurality of power cells connected in series for supplying electric power from a power supply facility to the motor after the electric power is subjected to voltage regulation and/or frequency conversion, so as to drive the motor to operate and generate a driving force.

18 Claims, 19 Drawing Sheets

(51) Int. Cl.
*F04B 17/03* (2006.01)
*H02P 27/08* (2006.01)
*F04B 17/06* (2006.01)

(56) References Cited

U.S. PATENT DOCUMENTS

| | | | |
|---|---|---|---|
| 2019/0267910 A1* | 8/2019 | Milivojevic | H02P 1/44 |
| 2021/0102451 A1 | 4/2021 | Robinson et al. | |
| 2023/0283215 A1 | 9/2023 | Li et al. | |
| 2023/0332493 A1 | 10/2023 | Zhong et al. | |

FOREIGN PATENT DOCUMENTS

| | | | |
|---|---|---|---|
| CN | 102957375 | A | 3/2013 |
| CN | 103795323 | A | 5/2014 |
| CN | 204089675 | U | 1/2015 |
| CN | 104953806 | A | 9/2015 |
| CN | 105207567 | A | 12/2015 |
| CN | 205193194 | U | 4/2016 |
| CN | 106712648 | A | 5/2017 |
| CN | 107896067 | A | 4/2018 |
| CN | 108900136 | A | 11/2018 |
| CN | 110513097 | A | 11/2019 |
| CN | 111204433 | A | 5/2020 |
| CN | 112127863 | A | 12/2020 |
| CN | 114553062 | A | 5/2022 |
| CN | 114977970 | A | 8/2022 |
| JP | 2011041471 | A | 2/2011 |

OTHER PUBLICATIONS

Non-Final Office Action for U.S. Appl. No. 18/315,888 mailed on Dec. 17, 2024.
Written Opinion and International Search Report for PCT Application No. PCT/CN2022/125638 mailed on Dec. 16, 2022.
Written Opinion and International Search Report for PCT Application No. PCT/CN2022/101882 mailed on Sep. 23, 2022.
International Preliminary Report on Patentability Chapter I for International Application No. PCT/CN2022/101882 mailed on Aug. 2, 2024.
First Office Action for Chinese Application No. 202210539846.7 mailed on Jun. 20, 2025.
Wang, "Oil Extraction Machinery", Textbook for Secondary Vocational Schools, Petroleum Industry Publishing House, Feb. 28, 2007 and summary in English.
Li et al., "Overview of Petroleum Drilling and Production Machinery", Jun. 30, 2011 and summary in English.
Notice of Allowance for U.S. Appl. No. 18/315,888 mailed on Mar. 31, 2025.
First Office Action for Chinese Application No. 202210053618.9 mailed on May 31, 2025.

* cited by examiner

VARIABLE FREQUENCY DRIVE SYSTEM, VARIABLE FREQUENCY SPEED REGULATION INTEGRATED MACHINE, PUMP SYSTEM, AND WELL SITE LAYOUT

CROSS-REFERENCE TO RELATED APPLICATIONS

This application is a continuation application of International Patent Application No. PCT/CN2022/125638 filed on Oct. 17, 2022, which claims priority to Chinese patent Application No. 202210539846.7 filed before China National Intellectual Property Administration (CNIPA) on May 18, 2022. All of the above-referenced applications are hereby incorporated by reference in their entirety.

TECHNICAL FIELD

The present disclosure relates to an oil-gas field operating field, specifically relates to a VFD (variable-frequency drive) system, a VFAS (variable-frequency adjustable-speed) integrated machine, a pumping system and a well site layout.

BACKGROUND ART

In the global oil-gas field operating field, an electrically-driven working apparatus (such as an electric fracturing apparatus, an electric pumping apparatus, or an electric cementing apparatus) in which a plunger pump is driven by using a motor instead of a diesel engine is widely known. Since such electrically-driven working apparatus uses the motor for driving, it not only has advantages of a small volume, a light weight and a large output power, but also has advantages in environmental protection, energy conservation, economy and the like. In a working site of the electrically-driven working apparatus, in order to further reduce the working cost and the $CO_2$ emission, it is generally necessary to supply the electric power from a power supply facility with a large power to a variable-frequency drive (VFD), and the VFD is used to perform a VFAS driving on the motor. FIG. 1 shows a pumping system including a VFD and an electrically-driven working apparatus according to the prior art. Specifically, the pumping system 90a includes a VFD 40a and an electrically-driven working apparatus 400, and the electrically-driven working apparatus 400 includes a motor 21 and a plunger pump 11 mechanically connected to the motor 21 and driven by the motor 21. Three-phase output terminals U, V and W of the VFD 40a are electrically connected to input terminals Ru, Rv and Rw of a three-phase winding of the motor 21, respectively. The electric power (e.g., an input voltage) from a power supply facility (not shown) is inputted to the VFD 40a, is subjected to voltage regulation and/or frequency conversion by the VFD 40a and then is supplied to the motor 21.

At least one of power modules such as IGBT (Insulated Gate Bipolar Transistor), IGCT (Integrated Gate Commutated Transistor), a diode, SCR (Silicon Controlled Rectifier), GTR (Giant Transistor), GTO (Gate Turn-Off Transistor) or IEGT (Injection Enhanced Gate Transistor) is used in the power unit of the VFD 40a. FIG. 2 shows one example of the VFD according to the prior art. In the example, the VFD 40a adopts the typical structure of a three-level VFD, and the power unit thereof includes a rectifier unit for achieving the AC-DC conversion, a filtering unit for stabilizing a DC voltage outputted from the rectifier unit and an inverter unit for achieving the DC-AC conversion. In FIG. 2, the rectifier unit adopts a twelve-pulse rectifier circuit obtained by connecting two three-phase bridges in series. The power module in each of the three-phase bridges adopts totally six diodes, among which diodes D1, D3, D5 constitute a common cathode group, and diodes D2, D4, D6 constitute a common anode group. The inverter unit includes a three-phase three-level inverter circuit, in which each phase inverter circuit (respectively corresponding to one of output terminals U, V and W) may include the following power modules: four IGBT switching transistors V11, V12, V21, V22; four freewheeling diodes VD11, VD12, VD21, VD22; and two clamping diodes VD1, VD2. The filtering unit is located at the DC side of the whole inverter unit and is obtained by connecting two filter capacitors in series so as to support and stabilize the DC side voltage. In the inverter unit, according to a certain on/off logic control, a phase voltage with three levels is generated at the AC side (e.g., for the output terminal U, the potential difference between the point U and the point O may be three levels of +Ud/2, −Ud/2, 0).

The problem in the first aspect is that the withstand-voltage capacity of the above power modules is limited (generally below 6 kV). However, the power supply facility with a large power (e.g., a power grid, an electric generator, an energy storing device, or the like) in the nowadays well sites is generally designed to satisfy a maximum power demand of the oil-gas field working (e.g., the rated electric power of single electric fracturing device is generally no less than 2000 kW, the rated electric power of single electric cementing apparatus is generally no less than 600 kW), and thus the input voltage from the power supply facility with a large power is generally no less than 10 kV. This causes that the input voltage from the power supply facility and the input voltage allowed by the VFD don't match with each other, and thus it is necessary to reduce the input voltage from the power supply facility via a voltage-reduction transformer and then input it to the VFD. The problem in the second aspect is that since one power unit of the VFD 40a corresponds to one motor 21 and the power unit generally includes two or more power modules, if some power module breaks down, the power unit including this failed power module cannot work, so that the VFD 40a stops and the motor 21 cannot normally work.

In the case where the voltage-reduction transformer is used to solve the problem in the first aspect, since the voltage-reduction transformer has a large volume and a large weight, various devices of the oil-gas field working site are generally assigned to at least two kinds of sleigh, i.e., a transducer sleigh and a working apparatus sleigh. FIG. 3 shows an example of the electrical connection mode of a power supply facility (not shown), transducer sleighs and electric fracturing devices which are the electrically-driven working apparatus according to the prior art. At least one electric fracturing device (e.g., the electric fracturing devices (1), (2), (3) and the like) is mounted on each of the working apparatus sleighs (not shown), while transformers, VFDs and the like in a number same to that of the electric fracturing devices on the corresponding working apparatus sleigh are mounted on each of the transducer sleighs (e.g., the transducer sleigh (1), (2) or the like). As may be seen, the VFD needs to be separately placed with respect to the motor, i.e., there is a distance between the VFD and the motor, therefore, many cables need to be connected between the motor and the VFD by the whole machine manufacturer or the workers in site. Moreover, the harmonic pollution causes a large amount of heat generated on the cables, and the heat will be transmitted to the motor; in addition, the harmonic pollution also directly causes an additional power loss of the motor and the motor heating. This causes the aging of the insulating material of the motor and a shortened lifespan of the motor, and the heat dissipation capability of the motor is not enough, thereby easily damaging the motor. The many cables also increase the occupied area and the complication of the apparatus production or the well site layout.

The problems in the second aspect also needs to be further solved.

SUMMARY

One purpose of the present disclosure is to provide a VFD system capable of reducing a withstand-voltage requirement on single power cell by using a plurality of power cells connected in series. Furthermore, the VFD system of the present disclosure further can prevent itself from shutdown due to the damage of individual power module or individual power cell.

Another purpose of the present disclosure is to provide a pumping system including the above VFD system.

Still another purpose of the present disclosure is to provide a VFAS integrated machine including the above VFD system and a pumping system including the VFAS integrated machine.

Still another purpose of the present disclosure is to provide a well site layout including any one of the above pumping systems.

According to one embodiment of the present disclosure, a VFD system is provided. The VFD system includes: a motor; and a plurality of power cells connected in series, for supplying electric power from a power supply facility to the motor after the electric power is subjected to voltage regulation and/or frequency conversion, so that the motor is driven and operates with an adjustable speed so as to generate a driving force.

According to one embodiment of the present disclosure, a VFAS integrated machine is provided, including the above VFD system, and at least a part of each of the power cells is integrated on the motor.

According to one embodiment of the present disclosure, a pumping system is provided, including an electrically-driven working apparatus and the above VFD system. The electrically-driven working apparatus includes a plunger pump that is mechanically connected to the motor and receives a driving force from the motor, so that the plunger pump is driven by the motor, pressurizes a working fluid and outputs the pressurized working fluid to work.

According to one embodiment of the present disclosure, a pumping system is provided, including an electrically-driven working apparatus and the above VFAS integrated machine. The electrically-driven working apparatus includes a plunger pump that is mechanically connected to the motor and receives a driving force from the motor, so that the plunger pump is driven by the motor, pressurizes a working fluid and outputs the pressurized working fluid to work.

According to one embodiment of the present disclosure, a well site layout is provided, including: the above pumping system; a sand blender communicating with a liquid inlet of the plunger pump; a sand supplying device for supplying sand to the sand blender; and a liquid supplying device for supplying liquid to the sand blender. The sand blender mixes the sand from the sand supplying device and the liquid from the liquid supplying device, so as to obtain a working fluid.

In some embodiments, the withstand-voltage requirement on single power cell may be reduced by using the plurality of power cells connected in series, so that the usage cost of the VFD is totally reduced.

In some embodiments, since the voltage-reduction transformer may be canceled by using the plurality of power cells connected in series, the VFAS integrated machine may be obtained by integration and may be directly connected to the power supply facility with a large power. Further, the present disclosure obtains a pumping system with a high integration by integrally installing such a VFAS integrated machine and the plunger pump together, and such a pumping system has convenience and universality for the most of oil-gas field well site.

In some embodiments, a phase-shifting transformer is used, which functions to perform electromagnetically isolation and reduce harmonic pollution so that a harmonic suppressing member is not needed, compared to the traditional multi-level (e.g., two-level, three-level, five-level and the like) VFD. If necessary, the phase-shifting transformer has a voltage reduction function in addition to a phase shift function.

In some embodiments, a bypass function and/or a bypath function is provided, which can prevent the VFD from shutdown caused by the damage of individual power cell or individual power module such as IGBT, thereby the normal operation of the VFD is more reliably ensured.

In some embodiments, in the pumping system, a working apparatus control system is closely combined with a VFD control system, and when the VFD control system informs a fault or failure information, the working apparatus control system can make a response in time and avoid a progress of the fault or failure.

In some embodiments, a voltage-division effect may be obtained by using the plurality of power cells connected in series. Compared to the traditional multi-level VFD, the present disclosure can adapt to the power supply with a higher voltage, can reduce the power loss of the cables, and can facilitate to reduce the diameter of the cables and reduce the workload for connecting the cable.

DESCRIPTION OF EMBODIMENTS

The detailed embodiments would be described in the following order.
   1. A pumping system including multiple power cells
   1.1 A structure example of the pumping system including the multiple power cells
   1.2 An example of the power cell
   1.3 A bypass function provided for the power cell
   1.4 A bypath function provided for the power cell
   1.5 The pumping system including the multiple power cells and a control system thereof
   1.6 A control method of the pumping system including the multiple power cells
   2. An electric fracturing device including a VFAS integrated machine
   2.1 The VFAS integrated machine
   2.2 A structure example of an electric fracturing device including the VFAS integrated machine
   2.3 A lubricating system of the electric fracturing device
   2.4 A heat dissipation system of the electric fracturing device
   2.5 A structure of the electric fracturing device integrated by a semitrailer
   3. A well site layout including a plurality of electric fracturing devices

[1. A Pumping System Including Multiple Power Cells]

<1.1 A Structure Example of the Pumping System Including the Multiple Power Cells>

Figure 4:
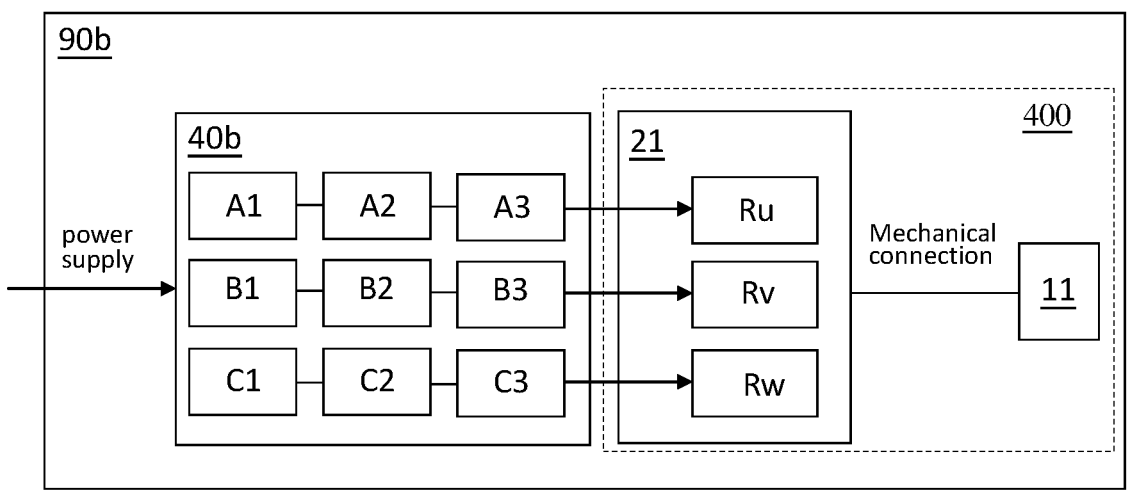
FIG. 4 shows a first example of the pumping system according to a first embodiment of the present disclosure.

FIG. 4 shows a first example of the pumping system according to a first embodiment of the present disclosure. In FIG. 4, the pumping system 90b includes a VFD 40b and an electrically-driven working apparatus 400, and the electrically-driven working apparatus 400 includes a motor 21 and a plunger pump 11 mechanically connected to the motor 21 and driven by the motor 21. As one example, the motor 21 is an AC motor, which has a three-phase winding, and the three-phase winding forms a star-shaped (Y-shaped) or triangle connecting structure and has respective input terminals Ru, Rv and Rw. With respect to the input terminal Ru of the motor 21, the VFD 40b has three power cells A1, A2 and A3 (which constitute the group A branch) electrically connected to this input terminal Ru and connected in series. With respect to the input terminal Rv of the motor 21, the VFD 40b has three power cells B1, B2 and B3 (which constitute the group B branch) electrically connected to this input terminal Rv and connected in series. With respect to the input terminal Rw of the motor 21, the VFD 40b has three power cells C1, C2 and C3 (which constitute the group C branch) electrically connected to this input terminal Rw and connected in series. The VFD 40b and the motor 21 constitute a VFD system of the present disclosure.

If the electric power from the power supply facility (not shown) is a DC (Direct Current) input voltage, all power cells A1~C3 in the VFD 40 each at least includes an inverter unit. If the electric power from the power supply facility is an AC (Alternating Current) input voltage, all power cells A1~C3 in the VFD 40b each at least includes a rectifier unit and an inverter unit. If necessary, power cells A1~C3 each may further include a filtering unit for filtering the burr and stabilizing the voltage. In a case where the electric power from the power supply facility is a multi-phase (e.g., three-phase) AC input voltage, the electric power may be subjected to rectification, filtering and inversion by power cells (e.g., group A) connected in series in the VFD with respect to the corresponding one phase winding of the motor 21, and then is supplied to the input terminal (e.g., Ru) of the corresponding one phase winding. The same applies to other two groups.

Typically, the supply voltage of power distribution grid in China mainly is 10 kV (50 Hz), while the supply voltage of the electric generator commonly used in states such as US is 13.8 kV (60 Hz). Even if the withstand-voltage capacity of single power cell is limited, the VFD of the present disclosure can perform a voltage division on the input voltage from the power supply facility by using the plurality of power cells connected in series, especially, can cancel the voltage-reduction transformer when the voltage division effect is significant because of the. Therefore, the VFD may be directly connected to the power supply facility with a large power (e.g., 10 kV or more) domestically and abroad.

Figure 5:
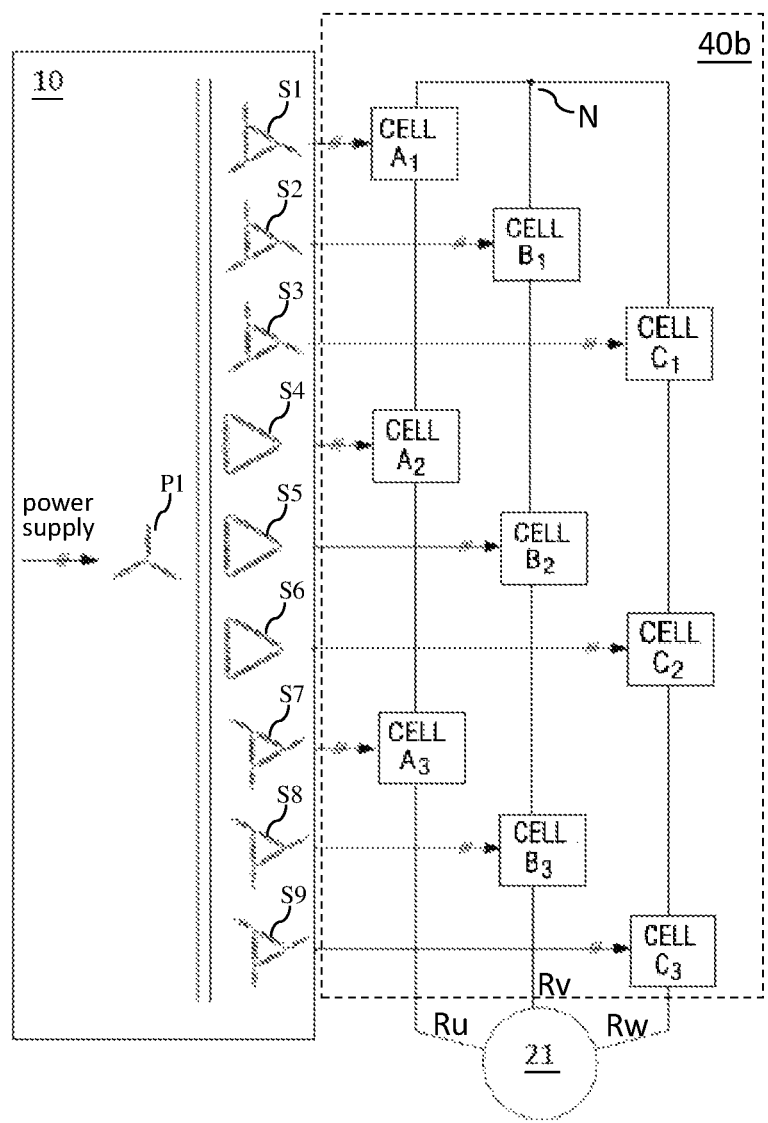
FIG. 5 shows a second example of the pumping system according to the first embodiment of the present disclosure.

FIG. 5 shows a second example of the pumping system according to the first embodiment of the present disclosure. In the pumping system of FIG. 5, the motor 21 is shown, but the plunger pump 11 is not shown. Among one group of power cells connected in series in any one branch, a motor side of the foremost power cell (i.e., A3; B3; C3) is electrically connected to the input terminal (i.e., Ru; Rv; Rw) of the corresponding one phase winding of the motor 21, and a side of the last power cell (i.e., A1; B1; C1) opposite to the motor side is connected to a floating neutral point N of the Y-shaped connecting structure. FIG. 5 differs from FIG. 4 in that a phase-shifting transformer 10 which is provided on the input side of the VFD 40b is further added.

The phase-shifting transformer is an essential component of a multi-pulse diode or a silicon controlled rectifier, the phase-shifting transformer generally has three functions: (1) achieving the phase shift between the line voltages on a primary side and a secondary side so as to eliminate harmonic; (2) obtaining a desired voltage value on the secondary side by converting the voltage on the primary side; and (3) achieving the electrical isolation between the rectifier unit and the power grid as the power supply facility. That is, during working, the phase-shifting transformer can transform (e.g., reduce) the power-frequency high-voltage (e.g., 10 kV and the like) power supply of the primary side winding to multiple groups of low-voltage (e.g., 620V, 690V or 1 kV and the like) power supply of the secondary side winding to be supplied to each of power cells. Furthermore, the phase-shifting transformer can also make input sides of the power cells isolated from each other (electrically isolated so as to be independent to each other) so as to facilitate the superposition of the voltage waveforms. Therefore, by utilizing the phase-shifting transformer, it is possible to achieve a multi-pulse rectification mode of phase-shift rectification, and to reduce the output harmonic content.

In some embodiments, for the power-frequency high-voltage power supply with the voltage level of 10 kV, the series number of the secondary side winding of the phase-shifting transformer may be nine levels or ten levels. For a product with nine levels, the voltage of every level is 690V, and the phase shift therebetween is 6.67°, thereby constituting a 54-pulse rectification mode. For a product with ten levels, the voltage of every level is 620V, and the phase shift therebetween is 6°, thereby constituting a 60-pulse rectification mode. The following table 1 shows, with respect to various voltage levels for the power-frequency high-voltage power supply, the examples of series number of the secondary side windings of the phase-shifting transformer, cell's input voltages and cell's busline voltages.

TABLE 1

Voltage level, Series number and Voltage

| voltage level (kV) | series number | cell input voltage (V) | cell busline voltage (V) |
| --- | --- | --- | --- |
| 3 | 4 | 460 | 620 |
| 6 | 5 | 690 | 930 |
| 6 | 6 | 620 | 815 |
| 6 | 8 | 460 | 620 |
| 10 | 9 | 690 | 930 |
| 10 | 10 | 620 | 815 |

Specific description is given with reference to FIG. 5. The phase-shifting transformer 10 may be an integrated transformer, which includes one three-phase primary winding P1 and a plurality of three-phase secondary windings S1~S9. Depending on the different connection modes of winding, the three-phase primary winding P1 may be a star-shaped (Y-shaped) or triangle connecting structure which has three input terminals connected to a power supply facility (not shown) so as to receive the electric power (a three-phase AC input voltage) from the power supply facility. The plurality of three-phase secondary windings S1~S9 each may be is triangle or extend-triangle connecting structure. The plurality of secondary winding S1~S9 each perform a phase shift on the output voltage of the primary winding P1, and then input it to the corresponding power cell in the VFD 40b, i.e., there is a certain phase difference between the output voltages of the plurality of secondary windings S1~S9. In some embodiments, the plurality of secondary windings S1~S9 each can also be further divided into a plurality of subgroups, and there is a certain phase difference between the output voltages of different subgroups. Among the plurality of secondary windings S1~S9, one-third of the secondary windings (e.g., S1~S3) can advance the phase, one-third of the secondary windings (e.g., S7~S9) can delay the phase, and the remaining one-third of the secondary windings (e.g., S4~S6) can keep the phase constant. In some embodiments, the secondary winding keeping the phase constant adopts a triangle connecting structure, and the secondary winding advancing or delaying the phase adopts an extend-triangle connecting structure.

In some embodiments, in addition to performing the phase shift function, the phase-shifting transformer 10 can perform a voltage regulation function as necessary. The turns ratio of the primary winding to the secondary winding of the phase-shifting transformer 10 equals to the voltage ratio of the voltage on the primary side to the voltage on the secondary side.

In some embodiments, the phase-shifting transformer 10 may be a phase-shifting transformer having a dual-voltage output, which can not only output an input voltage of 10 kV to the VFD 40b after the input voltage is reduced, and but also output a power-frequency AC of 380V to other electrical components.

In the first example shown in FIG. 4 and the second example shown in FIG. 5, the effective output voltage in any one branch consisting of three power cells is the voltage sum of all of the power cells in this branch. That is, the output voltage of the group A branch is the voltage sum of power cells A1 to A3, and the same applies to other two group branches.

In the above first example and second example, the number of power cells connected in series in any one branch is not limited to three, and is determined depending on the input voltage from the power supply facility and the input voltage allowed by each of the power cells may be 2~12. By the plurality of power cells connected in series, even if each of the power cells is per se consisted of members with a low rated-voltage standard, an enough large line voltage may be applied on the motor 21. Correspondingly, the motor 21 is preferably a medium/high-voltage motor having a better withstand-voltage capacity (e.g., the rated voltage of the medium/high-voltage motor is generally ≥ 1 kV). In addition, the motor 21 adopted in the embodiment of the present disclosure is not limited to a three-phase motor. The motor 21 may adopt a motor such as a six-phase motor, a twelve-phase motor or the like. In the embodiment of the present disclosure, since the variable-frequency AC is directly supplied to winding of each phase of the motor by the plurality of power cells connected in series, the rotation speed may be adjusted more stably, the efficiency is higher, and the generated harmonic pollution is lower.

Figure 6:
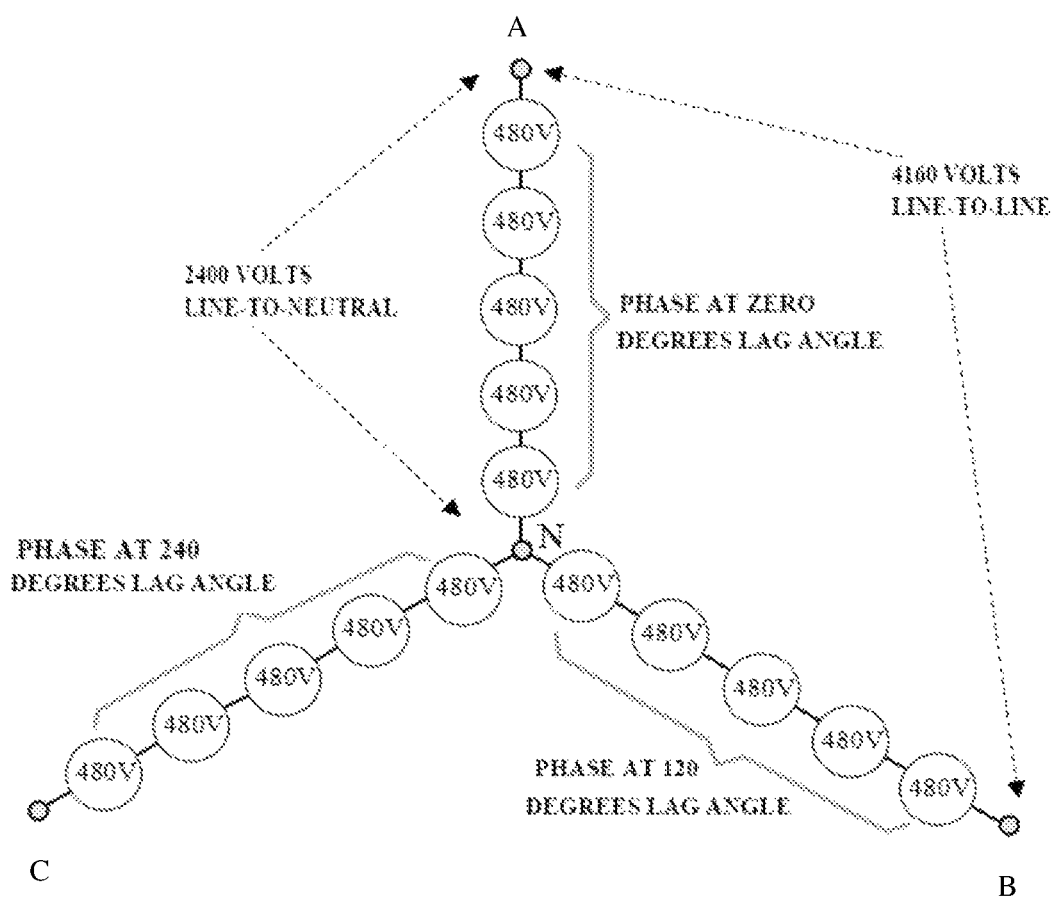
FIG. 6 shows a phase voltage and a line voltage in one specific example of three groups of power cells respectively connected to input terminals of a three-phase winding of the motor.

FIG. 6 shows a phase voltage and a line voltage in one specific example where three groups of power cells are respectively connected to input terminals of three-phase windings of the motor. In this specific example, the group (e.g., group A, group B or group C) of power cells in any one branch is five power cells connected in series. In each of group A, group B and group C, the motor side of the foremost one of the power cells is connected to the input terminal of the corresponding one phase winding of the motor, a side of the last one of the power cells opposite to the motor side is connected to a neutral point N of the Y-shaped connecting structure. It is described with reference to an example in which the rated voltage of each power cell is 480V, in this case, the phase voltage (line-to-neutral voltage)=480V×5=2400V, and the line voltage (line-to-line voltage)=2400V×1.732=4160V. The phase of each power cell in the first group of power cells (group A in FIG. 6) at the first phase has a lag angle of 0°, the phase of each power cell in the second group of power cells (group B in FIG. 6) at the second phase has a lag angle of 120°, and the phase of each power cell in the third group of power cell (group C in FIG. 6) at the third phase has a lag angle of 240°.

By using the plurality of power cells connected in series, it is possible to use an IGBT module (or other inversion modules) which can withstand a low voltage to replace the original IGBT module which can withstand a high voltage. This helps reducing the requirement of withstand-voltage capacity, difficulty in insulation and the like for single module, thereby reducing the total cost. An output voltage of 4160V may be generated by the plurality of power cells each having a rated voltage of 480V and connected in series. An output voltage of 6000V may be generated by the plurality of power cells each having a rated voltage of 630V and connected in series. As one example, in a case of the output voltage being 6600V, totally 18 power cells may be used, with an assumption that the rated voltage of the single power cell is 690V (which is a quite common voltage specification), so that the phase voltage=6 (6 power cells per phase)× 690V=4140V, the line voltage=the phase voltage× 1.732=4140V×1.732=7170V. Thereby, an input voltage of 7170V may be adjusted to be an output voltage of 6600V by adjusting the duty ratio of IGBT.

In view of this, the input voltage allowed by the VFD is increased, this facilitates reducing a current in the cable, reducing a power loss of the cable, reducing the diameter of the cable, simplifying the workload for connecting the cable and the like. For instance, in a case where a power supply of 10 kV is supplied by the power supply facility, the power supply may be directly supplied to the phase-shifting transformer, which satisfies the usage requirement of the VFD system.

<1.2 an Example of the Power Cell>

Figure 7:
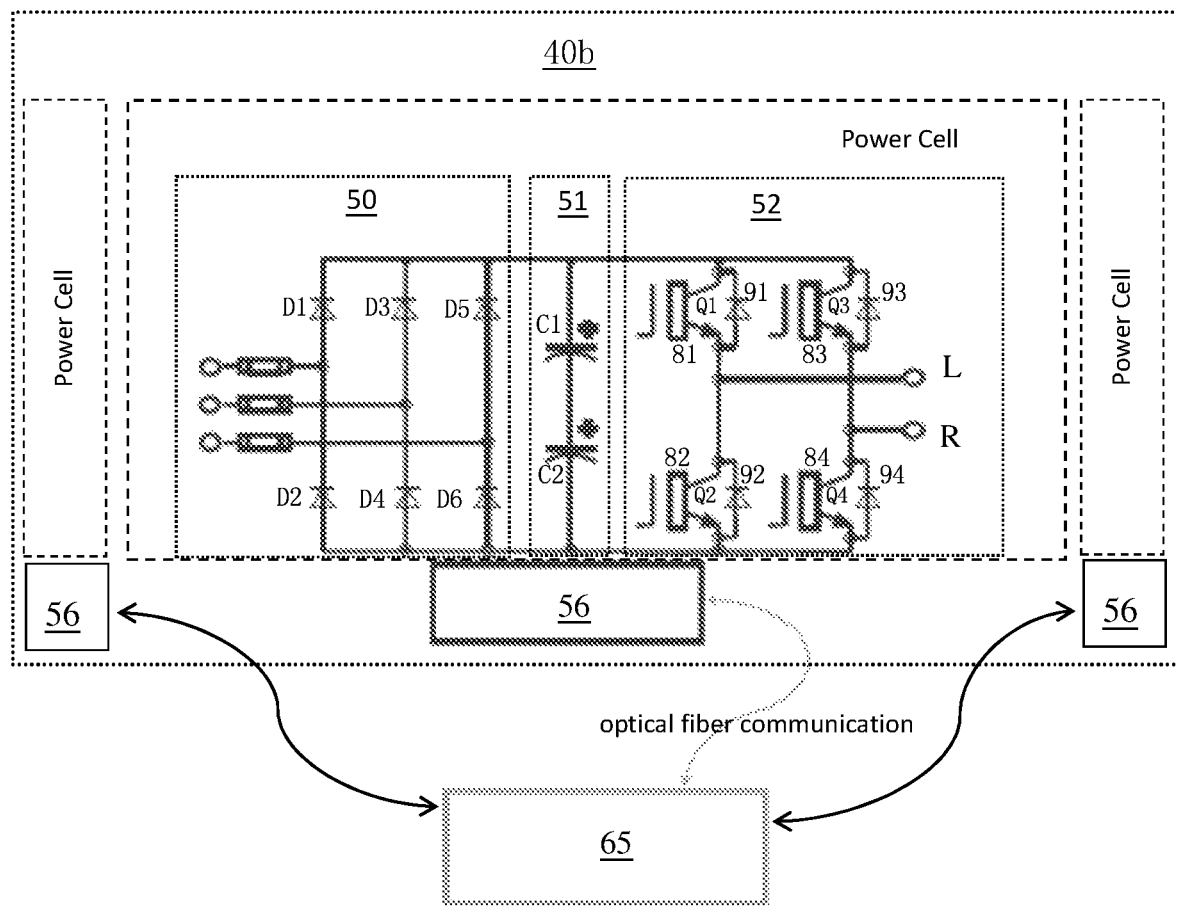
FIG. 7 shows a first example of one power cell of the plurality of power cells adopted in the pumping system according to the first embodiment of the present disclosure.

As described above, each power cell in any one branch in which the plurality of power cells are connected in series may include the inverter unit, may include a combination of the rectifier unit and the inverter unit, or may include a combination of the rectifier unit, the filtering unit and the inverter unit, as actual necessary. FIG. 7 shows a first example of one power cell of a plurality of power cells adopted in the pumping system according to the first embodiment of the present disclosure. The power cell may include a rectifier unit 50, a filtering unit 51 and an inverter unit 52. Here, in function, one power cell corresponds to one single-phase low-voltage (e.g., 3.3 kV) VFD which performs an AC-DC-AC conversion on the voltage. Specifically, the rectifier unit 50 rectifies the three-phase alternating-current (AC) voltage inputted from the power supply facility so that the voltage become a DC voltage, and then supplies the DC voltage to the filtering unit 51. The filtering unit 51 is provided between the rectifier unit 50 and the inverter unit 52, filters the output voltage of the rectifier unit 50 so that the waveform of the output voltage becomes smooth (the burr is filtered), and then supplies it to the inverter unit 52. The inverter unit 52 inverts the output voltage of the filtering unit 51 (so that it becomes an AC voltage), and then outputs it to the motor externally as the output voltage of the power cell.

FIG. 7 gives an example in which the rectifier unit 50 may adopt a three-phase bridge type 6-pulse rectifier circuit. The rectifier unit 50, which is consisted of diodes D1, D3, D5 connected in a manner of common cathode and D2, D4, D6 connected in a manner of common anode, can convert the inputted three-phase AC voltage into the DC voltage. In some embodiments, the upper arm and the lower arm of each of bridges of the rectifier unit 50 may be consisted of a plurality of diodes connected in series, and thus it is possible to achieve the voltage division function in the rectifier unit 50, thereby reducing a requirement on the withstand-voltage capacity for the diode. The filtering unit 51 may include at least one filter capacitor, such as capacitors C1 and C2. Here, each of capacitors C1 and C2 is represented in a form of a group of capacitors, and the actual required number of capacitors depends on the actual application. The DC output voltage of the rectifier unit 50 strides across the filtering unit 51, so that the DC output voltage is stored and smoothed. The DC power of the power cell may be selectively supplied to an output terminal L or R of the power cell by using a pulse width modulation (PWM) method, and the pulse width modulation is achieved by the inverter unit 52. The inverter unit 52 may adopt any type of a switching element that are allowed as necessary, or may selectively use various solid-state elements according to the power level. As shown in FIG. 7, the inverter unit 52 may adopt a bridge-type inverter circuit consisted of semiconductor switches Q1~Q4, and each of the semiconductor switches Q1~Q4 may include transistors 81~84 and diodes 9194, respectively. The number of the semiconductor switches, the filter capacitors, the rectifying diodes and the like used in the power cell of the embodiment of the present disclosure is not limited to the above number, and may be changed according to actual requirements.

As shown in FIG. 7, in the pumping system of the embodiment of the present disclosure, a VFD control panel 65 is also provided for the VFD 40b. Furthermore, in the VFD 40b, a cell control circuit 56 is correspondingly provided for each of power cells. The cell control circuit 56 and the gate terminal of each of semiconductor switches Q1~Q4 in the corresponding power cell are electrically connected to each other, so as to control the output voltage of the power cell and the required output waveform by operating the power cell. Each cell control circuit 56 also may communicate with the VFD control panel 65 by means of optical fiber communication or other wired or wireless communication, and execute the output instruction from the VFD control panel 65, so as to monitor and manage each power cell. The management for the power cell may include adjustment, reset and the like of the working state of the power cell. Each power cell is controlled by the VFD control panel 65 via each cell control circuit 56, it is possible to generate a relatively high voltage output even in a fault mode. Although FIG. 7 shows that the cell control circuit 56 is separately disposed outside of the power cell, the cell control circuit 56 may be integrally disposed inside of the power cell. Or the cell control circuits 56 may be integrally disposed together so as to be easily managed.

Figure 8:
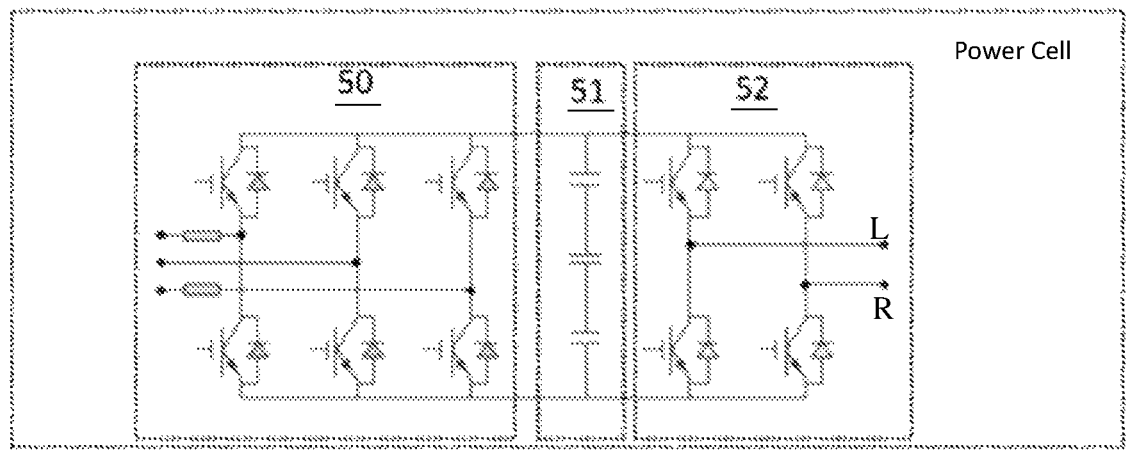
FIG. 8 shows a second example of one power cell of the plurality of power cells adopted in the pumping system according to the first embodiment of the present disclosure.
Figure 9:
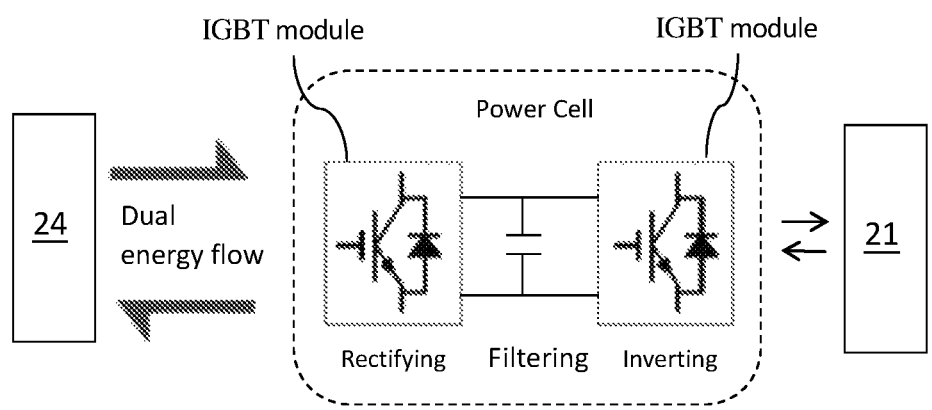
FIG. 9 is an illustrated view of a bidirectional energy flow corresponding to FIG. 8.

FIG. 8 shows a second example of one power cell of the plurality of power cells adopted in the pumping system according to the first embodiment of the present disclosure. The power cell shown in FIG. 8 mainly differs from that shown in 7 in that, IGBT module is adopted in both the inverter unit 52 and the rectifier unit 50. The IGBT module may be a composite full-control type voltage-driven power semiconductor device consisted of MOSFET (metal oxide semiconductor field effect transistor) and BJT (bipolar junction transistor), which has advantages of two aspects of the high input impedance of MOSFET and the low conduction voltage drop of GTR. As shown in FIG. 9, by performing rectifying by using the IGBT module and inverting by using the IGBT module, it is possible to achieve that not only electric power can be supplied to the motor 21 from the power supply facility (e.g., a power grid or an energy storing device) 24 via the power cell (a procedure of rectification-filtering-inversion), but also electric power can be generated by the motor 21 and transmitted reversely to the power supply facility 24, thereby achieving the bidirectional energy flow.

<1.3 A Bypass Function Provided for the Power Cell>

Figure 1:
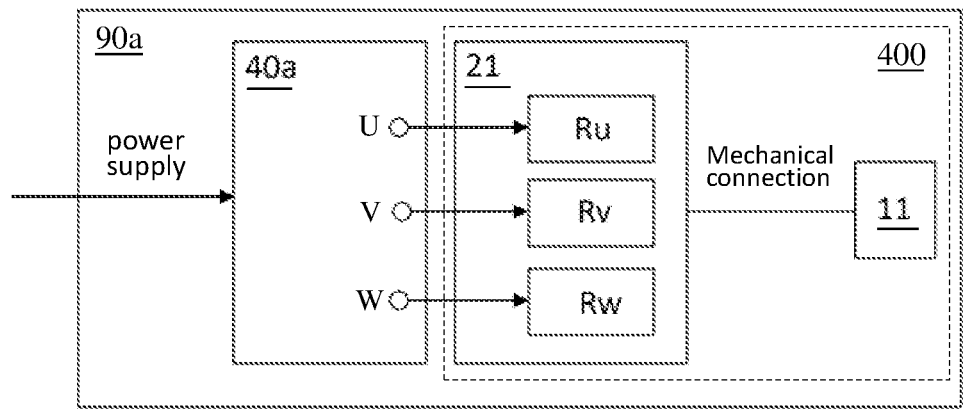
FIG. 1 shows a pumping system including a VFD and an electrically-driven working apparatus according to the prior art.
Figure 2:
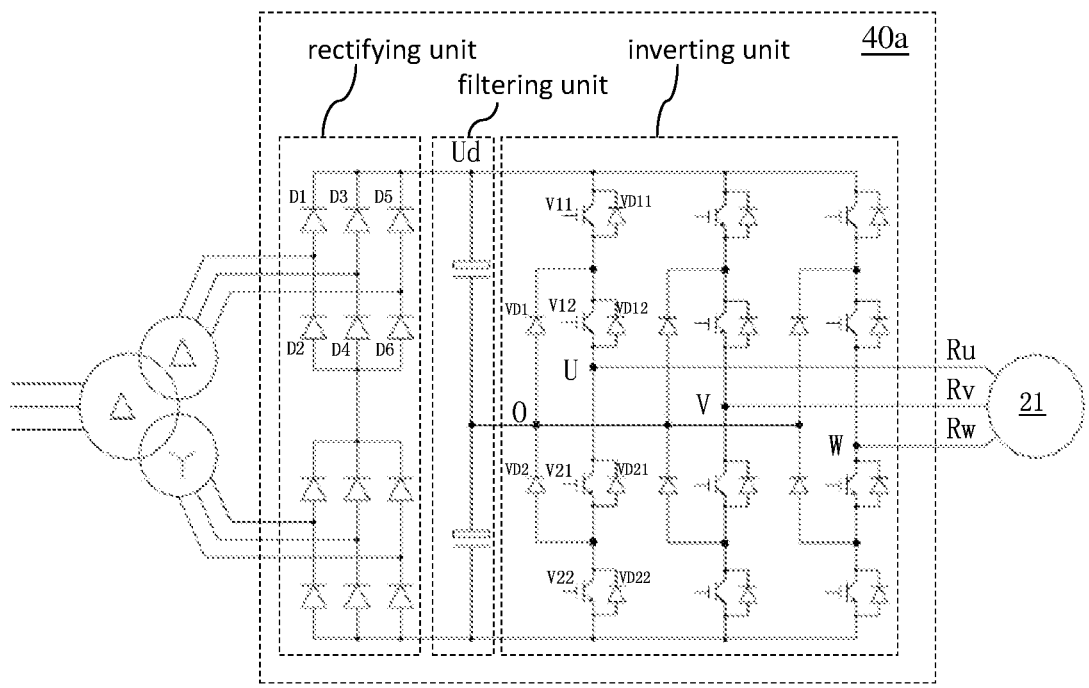
FIG. 2 shows one example of the VFD according to the prior art.
Figure 3:
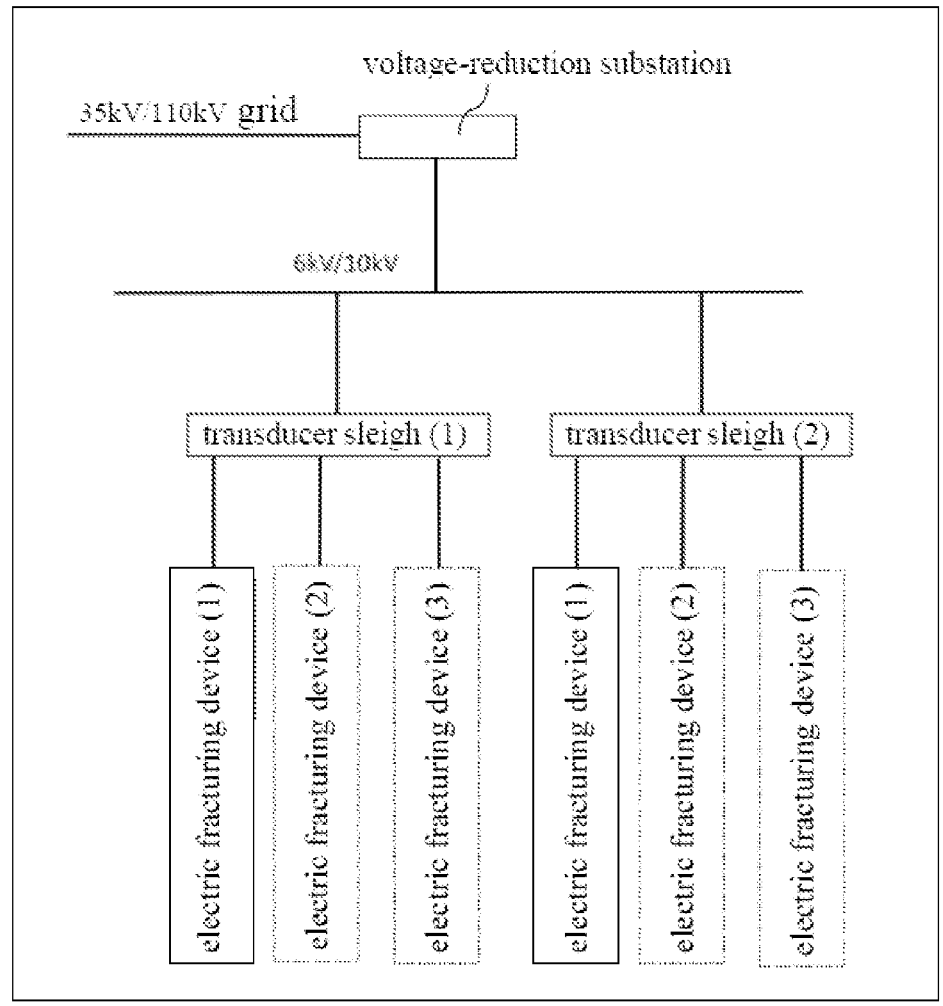
FIG. 3 shows an example of an electrical connection mode of a power supply facility, transducer sleighs and electric fracturing devices which are the electrically-driven working apparatus according to the prior art.

In the conventional pumping system shown in FIG. 1 or FIG. 2, once a power module or a power cell in the VFD 40*a* breaks down, the VFD 40*a* will stop its output, and thus the motor 21 will stop working. In contrast, in some embodiments, as apparent from FIG. 5 as described above, because there are the plurality of power cells connected in series in any one branch in the VFD 40*b*, even if a power cell A1 in the group A branch breaks down, other power cells A2 and A3 in the branch can still continue to work, and the effective output voltage supplied from the branch would decrease by an amount corresponding to a voltage contributed by the power cell A1 during the normal state, i.e., the total output power of other two power cells A2 and A3 that still continue to work is ⅔ of the rated output power in the branch. Then, after the reason (such as a transient overpressure) causing the power cell A1 to break down disappears, the information that the fault disappears would be notified to the corresponding cell control circuit 56 (e.g., referring to FIG. 7 or FIG. 10). The cell control circuit 56 communicates with the VFD control panel 65, and automatically recovers the normal working of the power cell A1 based the actual conditions in accordance with the instruction of the VFD control panel 65. Since the above control procedure is done automatically, the probability of shutdown of the VFD 40*b* is greatly reduced. If the reason causing a power cell to break down always do not disappear, the VFD 40*b* can still continue to work all the time, until the power cell which breaks down is replaced by the user when there is a condition to stop the VFD 40*b*.

For achieving the above purpose, in the embodiment of the present disclosure, it is possible to automatically bypass (or short-circuit) the power cell in an abnormal state or being damaged, or it is possible to manually or automatically bypass one or more power cell in the VFD according to the actual operating state.

Figure 10:
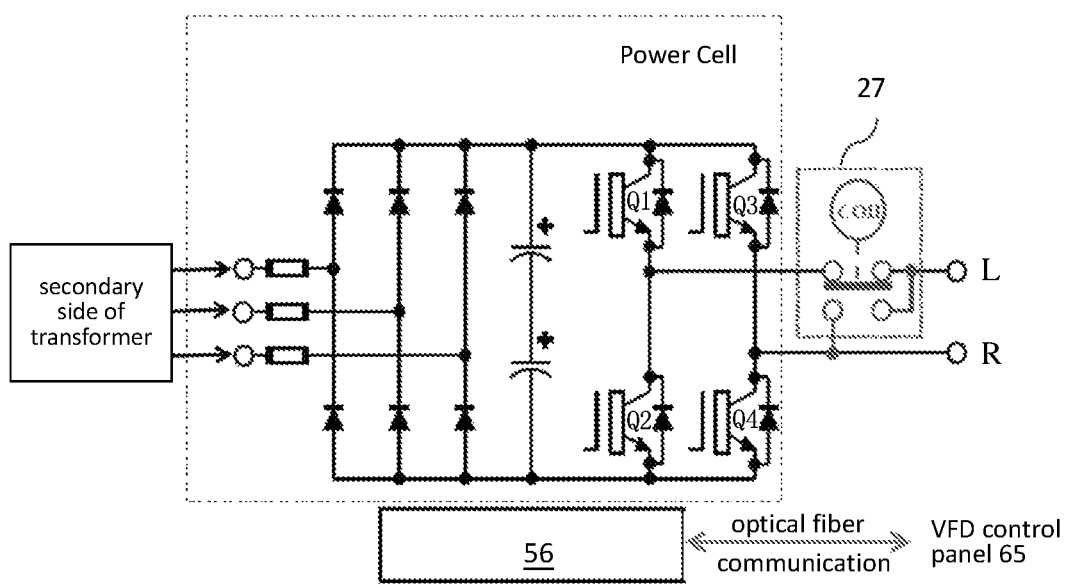
FIG. 10 shows one example in which a bypass contactor is provided for single power cell in the pumping system according to the first embodiment of the present disclosure.

FIG. 10 shows one example in which a bypass contactor is provided for single power cell in the pumping system according to the first embodiment of the present disclosure. The bypass contactor 27 is provided correspondingly to the power cell one by one. As shown in FIG. 10, when the power cell breaks down, the bypass is performed by utilizing the bypass contactor 27, and it is possible to accomplish the bypass within 1 s or even within 500 ms.

The bypass contactor 27 may be separately disposed with respect to the corresponding power cell, or may be integrated with the power module and the like in the corresponding power cell. The bypass contactor 27 may be a mechanical or electrical solid-state element. When the bypass contactor 27 is turned on, one branched path can be formed between output terminals L and R of the power cell. Therefore, the current can pass through the bypass contactor 27 rather than the power cell. If there is no bypass contactor 27, the power cell which breaks down cannot be bypassed, and the current passing through the branch containing the faulted power cell would become zero. Thus, it is preferable to provide such a bypass contactor 27 between output terminals L and R of each power cell. By doing so, the VFD 40*b* of the present disclosure can continue to effectively work whatever the fault occurs in one power cell or a plurality of power cells. It is known that some methods may be used to monitor and detect whether the power cell breaks down. One simple method is to compare the actual output voltage of the power cell to the rated output voltage. In other methods, an element for checking or recognizing the power cell may be also used, or a diagnostic program may be used.

As shown in FIG. 10, if one or more power cell is bypassed when a fault or the like happens, an information will be transmitted to the cell control circuit 56 corresponding to the power cell, and the cell control circuit 56 communicates with the VFD control panel 65 of the pumping system by means of optical fiber communication and the like, so that the VFD control panel 65 can appropriately reduce the pumping displacement of the pumping with reference to the current working pressure, the output power and the like according to the number of the power cells which breaks down, and in turn can reduce the actual usage power of the power cell or the motor to make it be less than a safety limit. The transformer at the left side of FIG. 10 is not necessarily needed, and is provided depending on actual conditions of the working site.

Figure 11A:
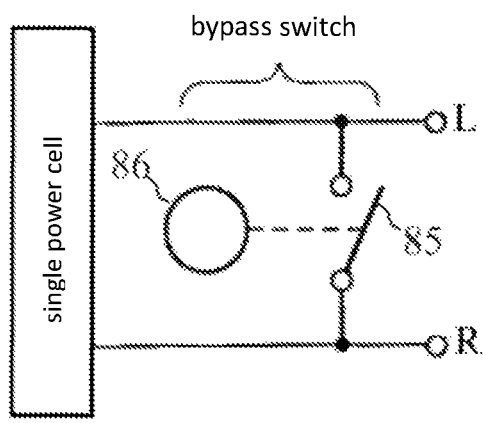
FIG. 11A to FIG. 11D are some examples showing alternative solutions for achieving the bypass function.
Figure 11B:
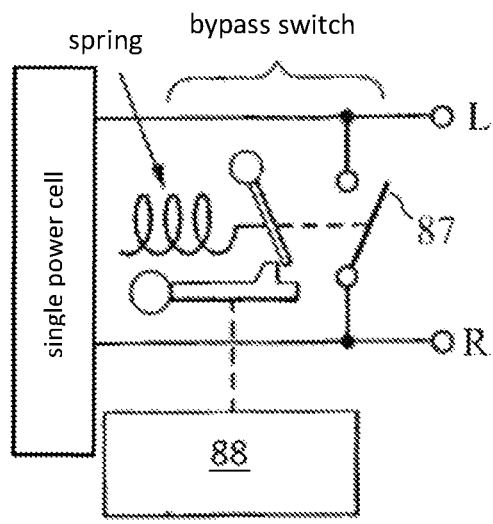
Figure 11C:
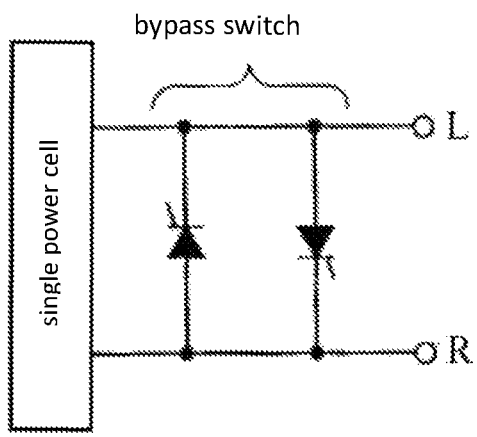
Figure 11D:
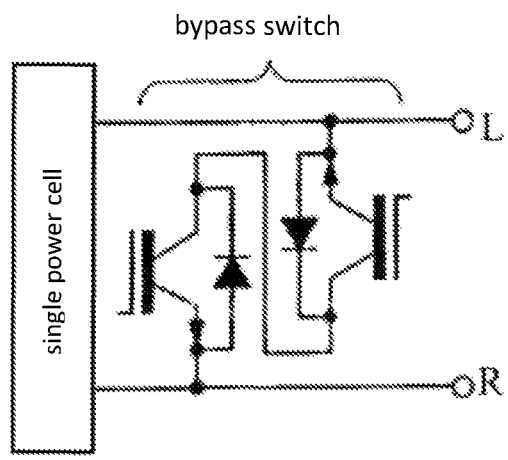

FIG. 11A to FIG. 11D are some examples showing alternative solutions for achieving the bypass function. Specifically, FIG. 11A shows an example of a bypass switch which bypasses the power cell by a relay or a contact point 85 of a contactor. In the bypass switch shown in FIG. 11A, when the contact point 85 in the open position is activated by an electromagnetic coil 86, a short circuit is formed between output terminals L and R of the power cell. FIG. 11B shows an example of a bypass switch which bypasses the power cell by a spring-loaded contact point 87 and a tripper releasing device 88. As shown in FIG. 11B, the tripper releasing device 88 can be operated to enable the spring-loaded contact point 87 to form a short circuit between output terminals L and R in the power cell. The tripper releasing device 88 may be electrically operated or mechanically operated. FIG. 11C shows an example of a bypass switch which bypasses the power cell by two silicon controlled rectifiers (SCR) having opposite polarities. In FIG. 11C, by turning on the two SCRs which are connected across output terminals L and R of the power cell in a reversely parallel manner, a short circuit is formed between output terminals L and R of the power cell. FIG. 11D shows an example of a bypass switch consisted of transistors connected in series. The configuration of the bypass switch used in the present disclosure is not limited to the above examples.

Figure 12A:
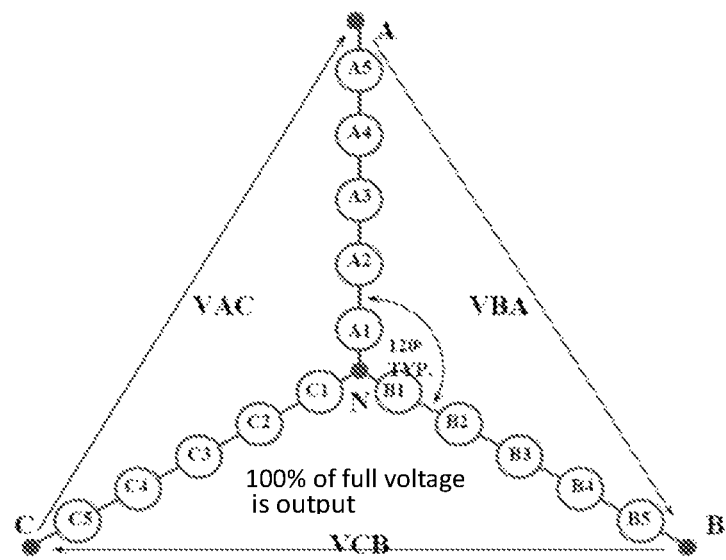
FIG. 12A and FIG. 12B respectively show output voltages, in a normal operating state and in a bypass state, of three groups of power cells as shown in FIG. 6 in a case where the bypass contactor is provided.
Figure 12B:
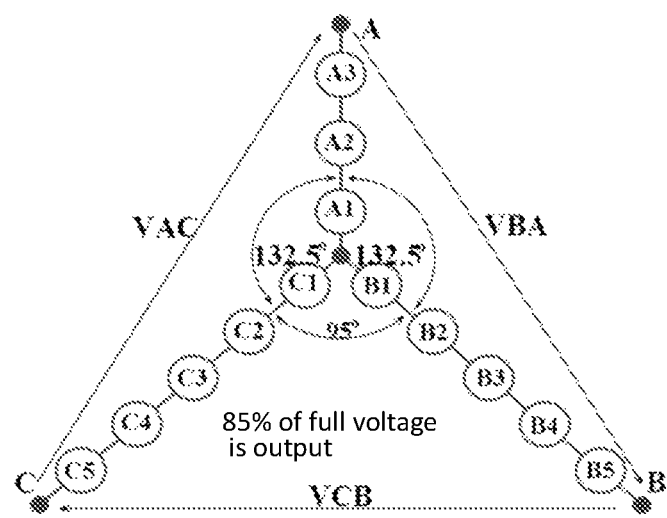

FIG. 12A and FIG. 12B respectively show output voltages, in a normal operating state and in a bypass state, of three groups of power cells as shown in FIG. 6 in a case where the bypass contactor is provided. As shown in FIG.

12A, in each branch (group A branch from point A to point N; group B branch from point B to point N; and group C branch from point C to point N) of the VFD provided for one phase winding of the motor, five power cells (A1-A5; B1-B5; and C1~C5) are connected in series. Assumed that the rated power of each power cell is the same (the value is set to be B1), the phase angles between group A branch and group B branch, between group B branch and group C branch, and between group C branch and group A branch are typically 120°. During the normal operation, the outputted line voltages VBA, VCB and VAC are completely symmetrical ((i.e., B1×5×sin(120°/2)×2=B1×5×1.732), thus, 100% of full voltage is output, and the neutral point of three branches fall at the cross point N of these three branches. When the power cells A4 and A5 break down, as shown in FIG. 12B, power cells A4 and A5 are bypassed by their respective corresponding bypass contactors, and these two power cells do not contribute to the total output voltage in the group A branch. At this time, the phase angle between group B branch and group C branch is reduced from 120° to 95°, and the phase angles between group C branch and group A branch and between group A branch and group B branch are increased from 120° to 132.5°, such angle adjustment can make line voltages VAC, VBA and VCB have the equal amplitude. Thereby, the neutral point of three branches shifts. Due to the shift of the neutral point, it ensures that other power cells in the VFD other than the power cell which breaks down can continue to operate with a reduced power. At this time, the phase voltage on the branch formed by the power cells A1, A2, A3 connected in series and the phase voltage on the branch formed by the power cells B1 to B5 connected in series are still the same, i.e., the maximum balanced line voltage at this time which can be used is B1×5×sin(95°/2)×2=B1×5×1.474. In view of this, the outputted line voltages VBA, VCB, VAC are completely symmetrical, thus, 85% (i.e., 1.474÷1.732=85%) of full voltage is output, and the motor can still receive balanced three-phase voltages.

The above angle adjustment (neutral point adjustment) depends on the number of the remaining effective power cells in each branch. If the number of the power cells of each branch is known, when a fault state is detected, it is possible to calculate an appropriate specific value indicating the phase angle relationship between the branches.

In the example described with reference to FIG. 12B as above, if one or more power cell (e.g., A4 and A5) breaks down, only power cells that break down (i.e., A4 and A5) are short-circuited or bypassed, and other power cells continue to work. By doing so, it is possible to maintain the effective output voltage and output power of the remaining power cells at a maximum level which is relatively high. In some embodiments, when one or more power cell (e.g., A4 and A5) breaks down, in order to maintain the balance of the effective output voltage applied on the three-phase input terminals Ru, Rv and Rw of the motor, the power cell which breaks down (i.e., A4 and A5) may be bypassed together with power cells at corresponding positions (i.e., B4 and B5 as well as C4 and C5) in other two branches. This point will be specifically described later.

Figure 13A:
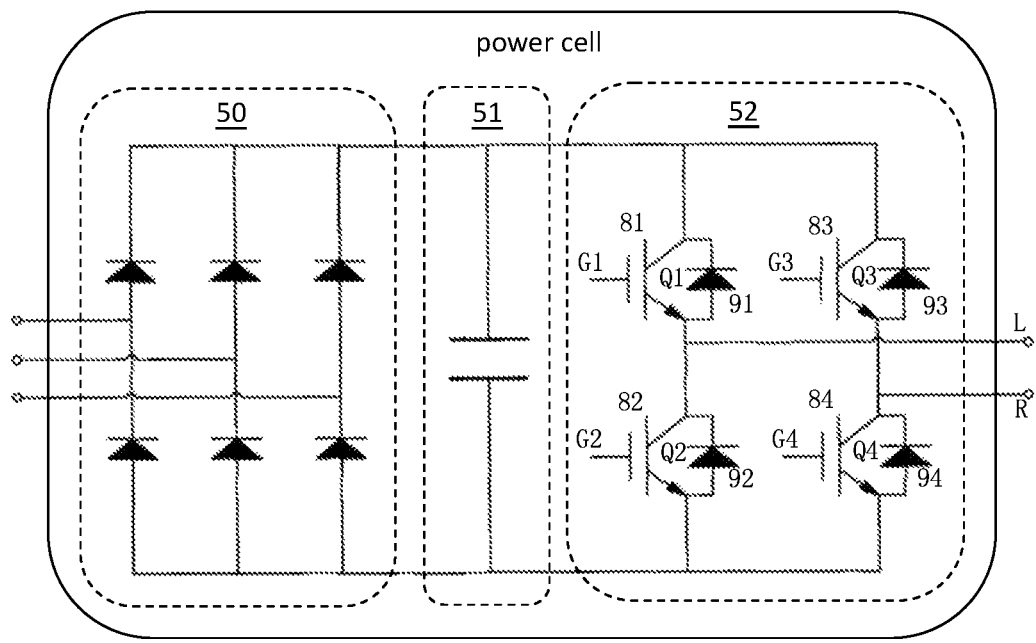
FIG. 13A shows one example of a bypass control on an IGBT module main loop in the pumping system according to the first embodiment of the present disclosure.
Figure 13B:
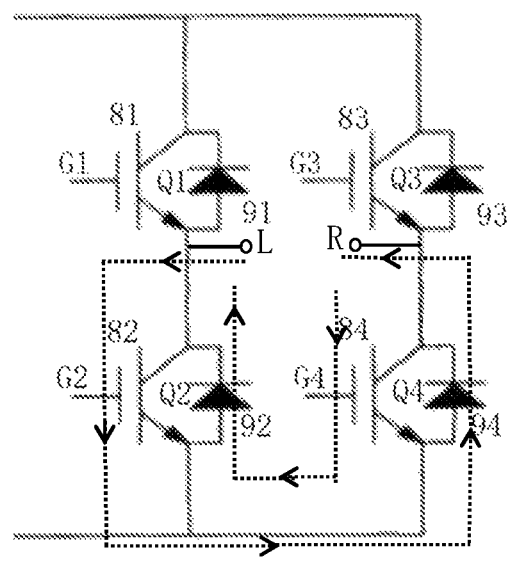
FIG. 13B is an enlarged schematic view of a bypass path in FIG. 13A.

FIG. 13A shows one example of a bypass control for an IGBT module main loop in the pumping system according to the first embodiment of the present disclosure. FIG. 13B is an enlarged schematic view of a bypass path in FIG. 13A. As shown in FIG. 13A, each of the plurality of power cells in each branch provided in the VFD of the example includes the rectifier unit 50, the filtering unit 51 and the inverter unit 52. The power cell has two output terminals: L terminal and R terminal. The power module of the inverter unit 52 adopts four IGBT modules Q1~Q4 which constitute the IGBT module main loop. IGBT modules Q1~Q4 respectively include: transistors 81~84; and freewheeling diodes 91~94 connected in parallel between the collector and the emitter of respective transistors 81~84. The gate terminal (G1, G2, G3, G4 in FIG. 13A) of each of transistors 81~84 is connected to the cell control circuit 56 (not shown in FIG. 13A, referring to FIG. 7 or FIG. 10).

Below, assuming a case in which an overheat fault occurs as an example, and the working process that the IGBT module main loop in the inverter unit 52 enters the bypass state is described in detail with reference to FIG. 13B.

First step: the overheat fault occurs in a power cell.

Second step: after the fault is detected by the cell control circuit 56, transistors 81 and 83 are immediately turned off, while transistors 82 and 84 are turned on. As shown by the dotted line arrow in FIG. 13B, when the current flows from L terminal to R terminal, the current's path is: successively passing through the transistor 82 and the diode 94 from L terminal and returning to R terminal; when the current flows from R terminal to L terminal, the current's path is: successively passing through the transistor 84 and the diode 92 from R terminal and returning to L terminal. Thus, it is possible to achieve the bypass function with respect to the power cell.

Third step: the VFD control panel 65 (not shown in FIG. 13A, referring to FIG. 7 or FIG. 10) recalculates an output waveform, and bypasses the power cells in other two phases at the positions corresponding to that of the above faulted power cell in the manner similar to the above second step.

After the overheat fault disappears, the working process of recovering the IGBT module main loop from the bypass state to the normal operating state is as follows:

First step: the power cell recovers a normal temperature, and the overheat fault disappears.

Second step: the disappearance of the fault of the power cell is detected by the cell control circuit 56, the VFD control panel 65 recalculates an output waveform, and recovers the power cell in which the fault disappears together with the power cells in other two branches at the corresponding positions from the bypass state to the normal operating state.

By performing the bypass control for the main loop consisted of the IGBT module as described above, it is possible to achieve an electrical switching function similar to that of the bypass contactor in FIG. 10 or that of the bypass switch in FIG. 11A to FIG. 11D and the like. In accordance with the above method, the power cell of the VFD is bypassed during the fault and recovers after the fault disappears, which can improve the reliability of the operation of the VFD.

The above example only exemplified the working process for achieving the bypass of the power cell and the working process for recovering the power cell from the bypass state to the normal operating state by using the transistor 82, the transistor 84, the diode 92 and the diode 94. Similarly, these working processes may be achieved by using the transistor 81, the transistor 83, the diode 91 and the diode 93.

Figure 14:
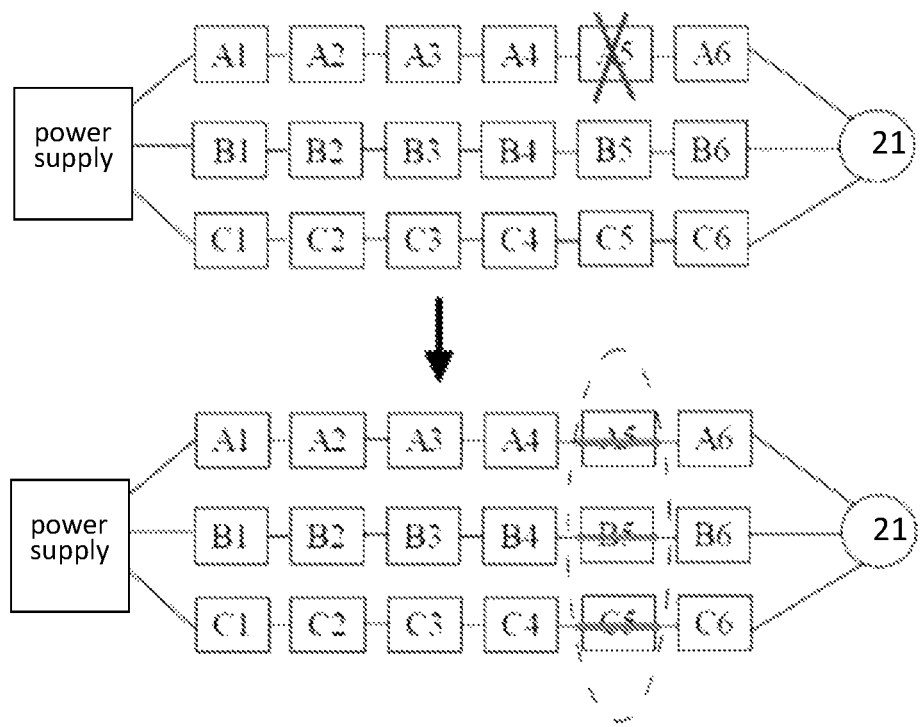
FIG. 14 shows a schematic view for implementing a bypass on a power cell which breaks down together with power cells at corresponding positions in other phases in the pumping system according to the first embodiment of the present disclosure.

FIG. 14 shows a schematic view for implementing a bypass control on a power cell which breaks down together with power cells at the corresponding positions in other phases in the pumping system according to the first embodiment of the present disclosure. As shown in FIG. 14, six power cells (A1 to A6; B1 to B6; and C1 to C6) in each branch in the VFD are connected in series. When any power cell (e.g., A5) in any branch breaks down, the cell control circuit corresponding to the power cell can transmit a fault warning signal to the VFD control panel 65 in a manner of wireless communication or wired communication, and the VFD control panel 65 coordinates various signals, so that in the case where bypass operation is allowed, the bypass of the power cell (i.e., A5) which breaks down is achieved with the shortest time, and at this time, the power cells (i.e., B5 and C5) in other two branches at the positions corresponding to that of the power cell which breaks down are also bypassed. After such bypass control, the VFD control panel 65 keeps the integrity of the output voltage waveform of each phase by changing the algorithm, so as to ensure the load such as the motor to continue working.

In the example described with reference to FIG. 13A, FIG. 13B and FIG. 14, by bypassing the power cell which breaks down together with the power cells in other phases at the corresponding positions and by recovering them together with each other from the bypass state, it is possible to ensure that the voltage applied to the three-phase windings of the motor is a symmetrical three-phase voltage, thereby the motor can work in balance.

<1.4 A Bypath Function Provided for the Power Cell>

Figure 15:
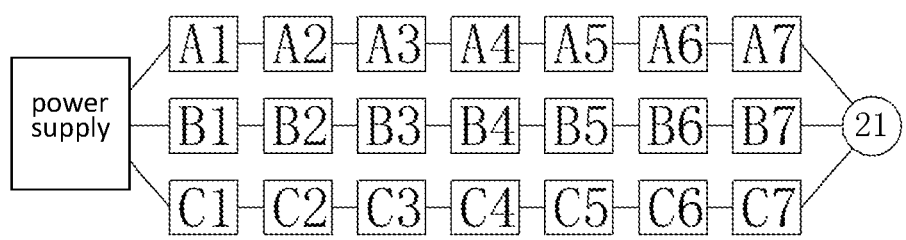
FIG. 15 shows a schematic view of a bypath power cell further added in FIG. 14.

FIG. 15 shows a schematic view of a bypath power cell which is further added in FIG. 14. Specifically, in each branch of the VFD, in addition to predetermined six power cells (A1 to A6; B1 to B6; and C1 to C6) which are connected in series, an auxiliary power cell (A7; B7; C7) is connected. The auxiliary power cell and a bypath switch (not shown) which is provided correspondingly to the auxiliary power cell one by one constitute a bypath power cell. The bypath switch may adopt a configuration similar to the above bypass switch or other appropriate configurations.

Typically, when the fracturing work is performed in the well site, the requirement for the stability of the working apparatus is very high, and once the shutdown occurs, it is not possible to perform the construction operation in accordance with a predetermined flow rate, or it is possible to cause the appearance of the operation failure. Thereby, according to this embodiment of the present disclosure, three auxiliary power cells A7, B7, C7 and the bypath switches corresponding to the power cells A7, B7, C7 are respectively added in three branches of the VFD. When all of the predetermined power cells (A1 to A6; B1 to B6; and C1 to C6) are in the normal operation, the auxiliary power cells A7, B7, C7 are in a disabled state, i.e., the bypath switches corresponding to the power cells A7, B7, C7 are turned on so that the auxiliary power cells A7, B7, C7 are in a bypass state. When the power cell A5 breaks down, three power cells A5, B5, C5 are bypassed and thus stop their output, and at this time, the bypath switches respectively corresponding to the auxiliary power cells A7, B7, C7 are turned off so that the auxiliary power cells A7, B7, C7 begins to be used and enters a working state from the bypass state, thereby replacing the bypassed power cells A5, B5, C5. In view of this, it is possible to ensure the normal operation of the VFD with the rated power.

The number of the bypath power cells in each branch may be not limited to one, and may be set based on the cost requirement and the statistical data of the number of the power cells that easily and simultaneously breaks down in each branch in the actual operation process.

<1.5 The Pumping System Including the Multiple Power Cells and a Control System Thereof>

Figure 16:
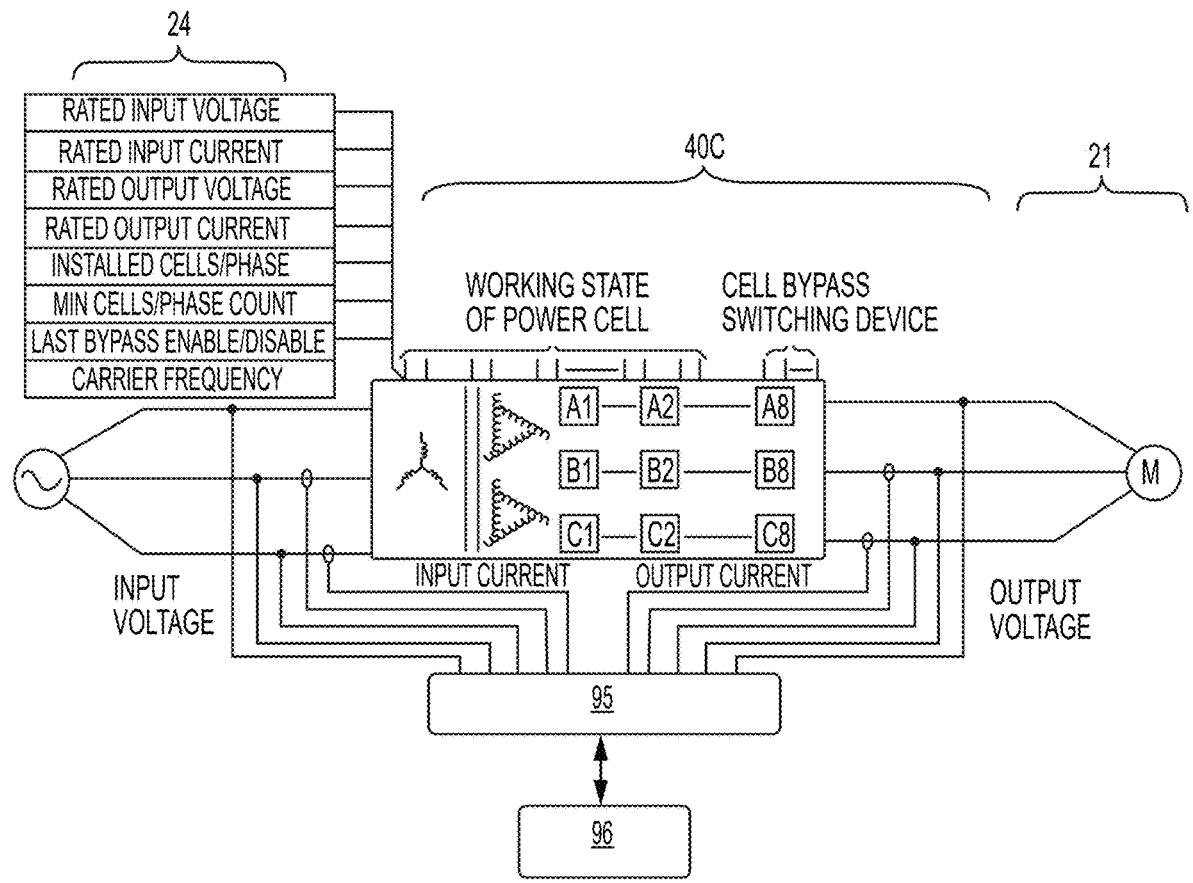
FIG. 16 shows an example of a pumping system and a control system thereof according to the first embodiment of the present disclosure.
Figure 17:
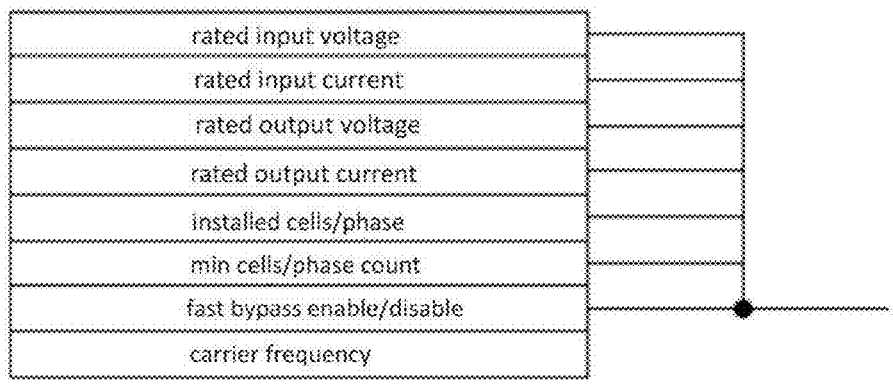
FIG. 17 shows a partial enlarged view of basic parameters for the VFD in FIG. 16.

FIG. 16 shows an example of a pumping system and a control system thereof according to the first embodiment of the present disclosure. The pumping system includes a power supply facility 24, a VFD 40c and an electrically-driven working apparatus, the electrically-driven working apparatus at least includes a motor 21 and a plunger pump (not shown) driven by the motor 21. The VFD 40c may include a phase-shifting transformer. Furthermore, at the output side of the phase-shifting transformer, the VFD 40c contains, for the winding of each phase of the motor 21, a corresponding branch consisted of a plurality of power cells connected in series (e.g., power cells A1~A7, and only power cells A1 and A2 are shown in FIG. 16) and a bypath power cell. The bypath power cell includes a cell bypass switching device and an auxiliary power cell (e.g., A8). Of course, in each branch, the number of the auxiliary power cells and the corresponding cell bypass switching devices may be not limited to one, and may be set based on the cost requirement and the statistical data of the number of power cells that easily and simultaneously breaks down in the actual operation process. As shown in FIG. 16, the pumping system further includes: a signal processing analysis and control system 95 for the VFD 40c; and a control system 96 for the electrically-driven working apparatus. The control system 96 for the electrically-driven working apparatus can communicate with the signal processing analysis and control system 95 for the VFD 40c, can obtain, from the communication information, basic parameters of the VFD 40c and actual operating parameters such as the input current, the input voltage, the output current, the output voltage, the speed regulation information state of the VFD during the working state, and can issue a control instruction to the signal processing analysis and control system 95 so as to adjust or reset the working state of each power cell in the VFD 40c and the like. FIG. 17 shows a partial enlarged view of basic parameters for the VFD 40c at the upper left portion of FIG. 16. Basic parameters of the VFD 40c are the rated input voltage, the rated input current, the rated output voltage, the rated output current, the number of the installed cells or phases, the minimum number of cells or phases, enable or disable of fast bypass, carrier frequency and the like. At least one of these basic parameters of the VFD and actual operating parameters of each power cell in the VFD may be transmitted to the signal processing analysis and control system 95, so that the signal processing analysis and control system 95 can achieve a control on each power cell based on the analysis and comparison of the basic parameters and the actual operating parameters.

The above electrically-driven working apparatus may be an electric fracturing device, an electric pumping device or an electric cementing device, and correspondingly, the above control system 96 for the electrically-driven working apparatus may be a fracturing device control system, a pumping device control system or a cementing device control system.

In the following description, for convenience, the control system 96 for the electrically-driven working apparatus in the pumping system is sometimes also called as a whole machine control system, and the signal processing analysis and control system 95 for the VFD 40c in the pumping system is also called as a VFD control system (e.g., which may be the VFD control panel 65 as described above).

<1.6 A Control Method of the Pumping System Including the Multiple Power Cells>

Figure 18:
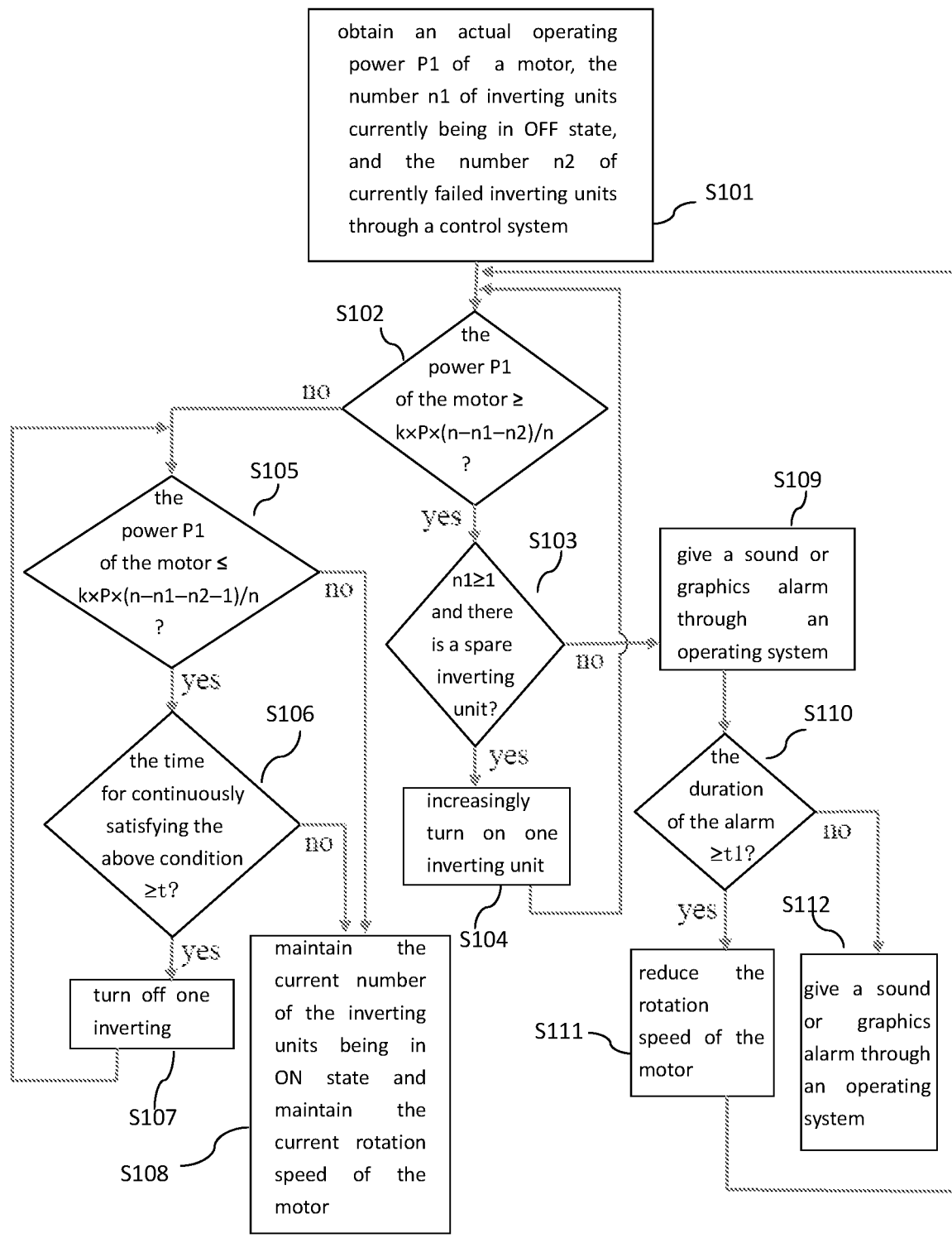
FIG. 18 is flow chart illustrating a control method of the pumping system according to the first embodiment of the present disclosure.
Figure 19A:
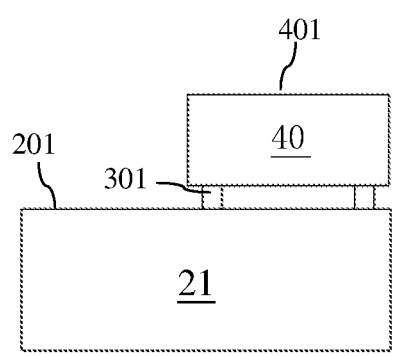
FIG. 19A to FIG. 19D respectively show a schematic block diagram of examples of a VFAS integrated machine according to a second embodiment of the present disclosure.
Figure 19B:
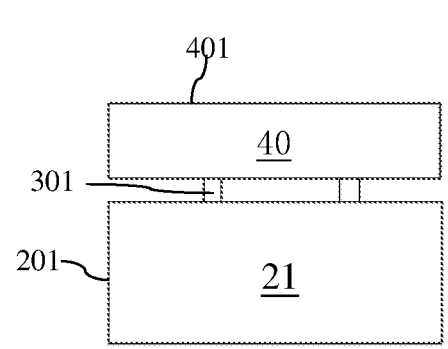
Figure 19C:
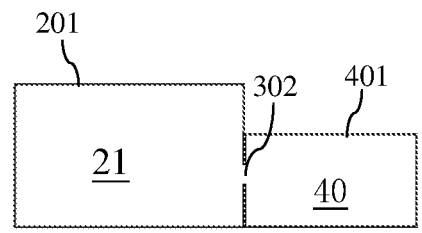
Figure 19D:
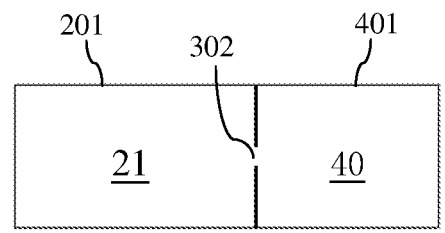

FIG. 18 is a control method of the pumping system according to the first embodiment of the present disclosure. The pumping system has a configuration described above with reference to FIG. 16. In order to facilitate the understanding, FIG. 18 exemplifies the case where each power cell only includes the inverter unit. Assumed that the total number of the inverter units connected in series is n, the rated power of the motor 21 is P, k is the safety coefficient of the pumping system and t is one preset time in the pumping system, t1 is a preset alarm duration in the pumping system, and t1 generally does not exceed the overpower operating time allowed by the motor. These parameters are inputted into or set in the whole machine control system 96. PLC (Programmable Logic Controller) is also provided in the whole machine control system 96, and this PLC can make a judgement based on the total output power of the VFD obtained from the VFD control system 95 or the operating power of the motor, or can make a judgement based on the busline current (e.g., the input current or the output current shown in FIG. 16). The following example is given in which a judgement is made according to the operating power of the motor.

In step S101, the whole machine control system 96 acquires information fed from the VFD control system 95, and acquires from the information the actual operating power P1 of the motor 21, the number n1 of the inverter units that are currently being in "OFF" state and the number n2 of the currently failed inverter units which are bypassed.

In step S102, on the basis of the information acquired in step S101, the whole machine control system 96 judges whether the actual operating power P1 of the motor 21 is equal to or larger than k×P×(n−n1−n2)/n. In a case of the judgement result being "yes", it means that the motor 21 is in the overpower operating state, and the procedure proceeds to step S103. In a case of the judgement result being "no", it means that the motor 21 does not reach the overpower operating state, and the procedure proceeds to step S105.

In step S103, the whole machine control system 96 judges whether the following conditions are satisfied: n1≥1 (i.e., there is currently at least one inverter unit in the closed state) and there exists a spare inverter unit. In a case of the judgement result being "yes", the procedure proceeds to step S104. In a case of the judgement result being "no", the procedure proceeds to step S109.

In step S104, the whole machine control system 96 instructs the VFD control system 95 to newly turn on one inverter unit. Then, the procedure proceeds back to step S102 so as to continue the circulation of making a judgement and the subsequent steps.

In step S105, the whole machine control system 96 judges whether the actual operating power P1 of the motor 21 does not exceed k×P×(n−n1−n2−1)/n. In a case of the judgement result being "yes", the procedure proceeds to step S106. In a case of the judgement result being "no", the procedure proceeds to step S108.

In step S106, the whole machine control system 96 judges whether the time for continuously satisfying the condition in step S105 is equal to or larger than the preset time t. In a case of the judgement result being "yes", the procedure proceeds to step S107. In a case of the judgement result being "no", the procedure proceeds to step S108.

In step S107, the whole machine control system 96 instructs the VFD control system 95 to turn off one inverter unit. Then, the procedure proceeds back to step S105 so as to continue the circulation of making a judgement and the subsequent steps.

In step S108, the whole machine control system 96 instructs the VFD control system 95 to maintain the current number of the inverter units being in "ON" state, and to maintain the current rotate speed of the motor.

In step S109, the whole machine control system 96 gives an alarm through the operation system of the whole machine control system, such as giving a sound or graphics alarm.

In step S110, the whole machine control system 96 judges whether the duration of the alarm in step S109 is equal to or larger than the preset alarm duration t1. In a case of the judgement result being "yes", the procedure proceeds to step S111. In a case of the judgement result being "no", the procedure proceeds to step S112.

In step S111, the whole machine control system 96 instructs the VFD control system 95 to appropriately reduce the rotate speed of the motor. Then, the procedure proceeds back to step S102 so as to continue the circulation of making a judgement and the subsequent steps. The adjustment for the rotate speed of the motor may be gradually performed step by step.

In step S112, the whole machine control system 96 gives an alarm through the operation system of the whole machine control system, such as by giving a sound or graphics alarm.

The control method of the pumping system of the present disclosure is not limited to the above example. Furthermore, after the bypass function in the present disclosure is combined with the control system in the pumping system, the control method of the pumping system may include: (1) winding of each phase of the motor receives the variable-frequency current (the output voltage or the output current) supplied from the plurality of power cells connected in series on the corresponding branch in the VFD, and when one or more power cell breaks down, the failed power cell is bypassed, other power cells can still continue to work so that the motor can still operate; (2) by assuming that the total number of the power cells connected in series in each branch is n and assuming that m power cells are bypassed, the actual effective power on the branch is at least reduced from the rated power by m/n; (3) once an event in which the power cell is bypassed occurs, the event information will be transferred to the cell control circuit corresponding to the power cell, the cell control circuit communicates with the VFD control system, the VFD control system will send the alarm information to the whole machine control system, the whole machine control system will issue an alarming signal and an alarming (e.g., graphics, color, characters, sound and the like) information will occur on the operation system (e.g., the image interface or the voice interface) of the whole machine control system, so as to present the fault of the VFD or the alarming information. Furthermore, the control method of the pumping system may further include: with the whole machine control system, the pumping displacement of the pumping system can be appropriately reduced based on the number of the failed power cells according to the current working pressure, the output power and the like, thereby, the actual operating power of the power cell or the motor can be reduced to be lower than a safety limit. In addition, the control method of the pumping system may further include: when the power cell which breaks down is bypassed, the power cell which breaks down is replaced by the bypath power cell and continues to work.

Furthermore, in addition to communicating with the VFD control system, the whole machine control system can communicate with a coolant pump, a lubrication oil pump, a heat dissipation system, a power distribution system, a remote control system and the like. According to operation requirements or instructions from the remote control system, the whole machine control system can issue instructions to the VFD control system, the coolant pump, the lubrication oil pump, the heat dissipation system, the power distribution system and the like, so as to ensure the normal operation of the whole pumping system.

The VFD control system can at least detect one of the input voltage and the input current and one of the output current and the output voltage of the VFD.

The whole machine control system can adjust the rotate speed of the motor according to working conditions of the VFD. When the inverter unit cannot normally provide an output, the whole machine control system can reduce the output power of the VFD so as to prevent the motor from being operated with an overpower.

Furthermore, the well site is generally provided with a remote centralized control system. The function of the remote centralized control system includes: the starting/stopping of the motor, the speed adjustment of the motor, the emergency stop of the motor, the reset of the VFD, the monitoring of critical parameters (e.g., voltage, current, torque, frequency, temperature, pressure, gas composition and content) of the well site and the like. When one or more of a plurality of working apparatuses in the well site breaks down, the whole machine control system can transfer an alarming information to the remote centralized control system, so that the remote centralized control system can automatically adjust the operation conditions of apparatus other than the apparatus that breaks down according to the total flow rate of the plurality of working apparatuses, the wellhead pressure in the well site and the like. In a case where the total flow rate set in advance in the remote centralized control system is 8 m$^3$/min and the well site has six electric fracturing devices in total, if one or more devices have a problem that its rotate speed decreases, the remote centralized control system can control the remaining five devices to appropriately increase their displacement, so as to ensure the desired 8 m$^3$/min displacement. For another example, in a case where it is set in advance that the pressure at a specified position in the fracturing working process needs to reach 80 MPa, if one or more apparatus decreases its displacement due to the above problem, and at this time, the pressure decreases by 5 MPa, the remote centralized control system can automatically increase the rotate speed of other apparatus so as to increase the displacement, until it reaches the set pressure requirement.

If the load rate of all apparatuses being in "ON" state in the well site is relatively high, the remote centralized control system can automatically start the spare electric fracturing apparatus, so as to satisfy the set pressure or flow rate.

If the VFD breaks down, it is possible to implement the reset of the VFD by the remote centralized control system.

[2. An Electric Fracturing Device Including a VFAS Integrated Machine]

<2.1 The VFAS Integrated Machine>

Since the VFD 40 of the present disclosure adopts the mode in which a plurality of power cells are connected in series, and the present disclosure can adopt a medium/high-voltage motor, it is possible to match with the input voltage of the power supply facility by changing the series number of the plurality of power cells connected in series, adjusting the power cell's own parameters and starting the spare power cell(s). Therefore, VFD 40 has a withstand-voltage capacity, and even in some cases, it is possible to directly connect it to the power supply facility without additionally adjusting the voltage by using a voltage-reduction transformer. Since such VFD 40 does not contain a voltage-reduction transformer, the volume and weight of VFD 40 are much smaller than the VFD containing a transformer in the prior art, the VFD 40 can be directly integrated with the motor. FIG. 19A to FIG. 19D respectively shows a schematic block diagram of examples of a VFAS integrated machine according to a second embodiment of the present disclosure. The VFAS integrated machine includes a motor 21 and a VFD 40 integrally installed on the motor 21 (as one piece) and for driving the motor 21, and the VFD 40 is electrically connected to the motor 21 through a power supply cable. Such VFAS integrated machine can reduce the occupied space (volume) and weight of the whole machine layout, and the length of the power supply cable from the VFD 40 to the motor 21 is close to zero distance.

In a case of being supplied with DC, the plurality of power cells in the VFD 40 each can only include the inverter unit, and at this time, these inverter units may be integrally installed on the motor 21. In a case of being supplied with AC, the plurality of power cells in the VFD 40 each further includes the rectifier unit, and at this time, the rectifier unit may be integrally installed on the motor 21 together with the inverter unit, or the rectifier unit may be separately provided outside of the VFAS integrated machine. The same is also true for the case where the plurality of power cells each further includes the filtering unit. By integrally installing at least a part (e.g., the power cell) of the VFD 40 on the motor 21, it is possible to reduce the occupied space of the whole machine layout. By providing other parts (e.g., the parts such as the VFD control panel, the phase-shifting transformer and the like other than the power cell) of the VFD 40 that are not integrally installed on the motor 21 separately outside the VFAS integrated machine (e.g., providing other parts in the control cabinet), it is also possible to achieve a balanced distribution of the weight and space, thereby avoiding the problem of local overweight or local oversize of the whole VFAS integrated machine upon all parts being integrally placed. Furthermore, a part (e.g., the inverter unit) or all parts of the power cell can be integrally installed on the motor 21.

In one example, the bottom surface of the motor may be at least partially installed on one base (e.g., a supporting frame or a sleigh, which may have a plate or do not have a plate). When the VFAS integrated machine is placed together with the base on the ground in the working site, the above base is preferably adjustable so as to conform with various shapes of the ground, thereby enhancing the horizontality and the stabilization of the VFAS integrated machine during the operation.

As shown in FIG. 19A to FIG. 19D, the VFD 40 and the motor 21 can respectively have a first housing 401 and a second housing 201. The first housing 401 may be directly connected to the second housing 201 by means of bolts, screws, riveting or welding, or may be fixedly connected to the second housing 201 via a mounting flange. At least one hole 302 or binding post 301, through which the power supply cable passes, may be disposed in the connection surfaces of the first housing 401 and the second housing 201, and the connection surfaces together with the hole 302 or binding post 301 constitutes a housing transitional portion, so that the electric power after being subjected to voltage regulation and/or frequency conversion by the VFD 40 is outputted to the motor 21 via a short distance, so as to drive the motor 21 to operate with an adjustable rotate speed.

When the first housing 401 of the VFD 40 is integrally installed (as one piece) on a certain mounting surface of the second housing 201 of the motor 21, the first housing 401 can occupy at least a part of or all the mounting surface, or can partially go beyond the mounting surface (not shown). The mounting surface may be a top surface or a side surface (preferably, any one of two side surfaces parallel to the extension direction of a transmission output shaft of the motor 21) of the second housing 201. Or, in a case where the bottom surface of the second housing 201 is not fully in contact with the base or the ground, the bottom surface can serve as the mounting surface. Here, it is more preferable that the top surface of the second housing 201 serves as the mounting surface, because the top surface of the second housing 201 itself can play a role of fixing and supporting the VFD 40 in the vertical direction, the VFD 40 does not need a separate occupied area in the horizontal direction, and such installation mode greatly saves the installation space, thereby making the whole apparatus more compact.

In some embodiments, shapes of the first housing 401 of the VFD 40 and the second housing 201 of the motor 21 may be a cylindrical object such as a cuboid, a cube or a cylinder, and the present disclosure is not specifically limited to the shape thereof. When shapes of the first housing 401 and the second housing 201 are a cuboid or a cube, it facilitates both of them to be fixedly installed, so as to enhance the stabilization of the entire device.

Therefore, the power supply cable of the VFD 40 can reach inside of the motor 21 only via the housing transitional portion, with almost zero distance between the motor 21 and the VFD 40. It effectively shortens the cable. The cable between the VFD 40 and the motor 21 may be disposed inside of the second housing 201 of the motor 21, which can reduce the interference on the well site.

From above, the VFAS integrated machine of the present disclosure can achieve a high-voltage variable-frequency control on the high-voltage motor, and has advantages of compact structure, high system efficiency, excellent performance and the like. It solves the problem in the prior art that the output distance of the high voltage VFD is limited, and the output cable generates an interference on the peripheral device, and it also avoids the case where the insulation aging and even breakdown of the motor is caused by the excessive spike in the motor terminal voltage due to a long distance level power supply.

<2.2 A Structure Example of an Electric Fracturing Device Including the VFAS Integrated Machine>

Figure 20:
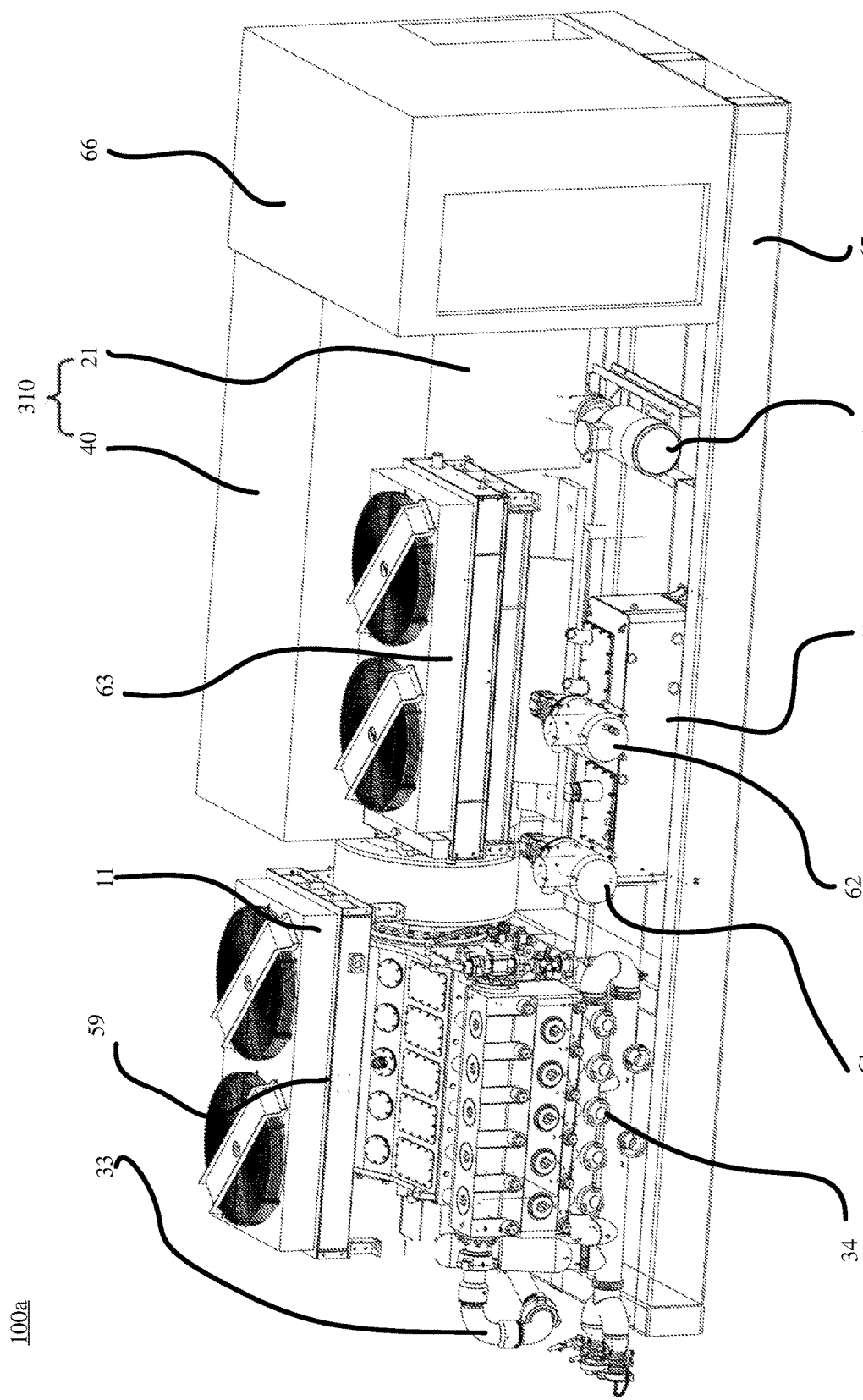
FIG. 20 shows a perspective diagram of an integrated layout of an electric fracturing device including the VFAS integrated machine according to a first example of a third embodiment of the present disclosure.

FIG. 20 is a perspective diagram of an integrated layout of an electric fracturing device including the VFAS integrated machine according to a first example of a third embodiment of the present disclosure. As shown in FIG. 20, the electric fracturing device 100*a* includes: a support frame 67; a VFAS integrated machine 310 installed on the support frame 67; and a plunger pump 11 installed on the support frame 67 and integrally and mechanically connected to the VFAS integrated machine 310. The plunger pump 11 is driven by the VFAS integrated machine 310 so as to pump the fracturing fluid to underground.

The VFAS integrated machine 310 includes the motor 21 and the VFD 40 integrally installed on the motor 21. As described above, the VFAS integrated machine 310 may not need a voltage-reduction transformer. The rated frequency of the VFAS integrated machine 310 may be 50 Hz or 60 Hz, and this rated frequency is the same as the power supply frequency of the power supply facility such as a power supply grid, so that the VFAS integrated machine 310 can be directly connected to the power supply facility such as a power supply grid. Therefore, the power supply mode is simplified, and a better adaptability is obtained. In view of this, by containing the VFAS integrated machine 310, the whole electric fracturing device 100*a* can allow its external cable to be directly connected to the power supply facility with a large power, without via a voltage-reduction transformer.

As one example, the transmission output shaft of the motor 21 can be directly and mechanically connected to the transmission input shaft of the plunger pump 11. They may be connected through splines (key slot). The transmission output shaft of the motor 21 may have an internal spline or an external spline or a flat key or a conical key, the transmission input shaft of the plunger pump 11 may have an external spline or internal spline or a flat key or a conical key that engages with the above spline or key. In this case, the transmission output shaft of the motor 21 may have a housing for protection, the transmission input shaft of the plunger pump 11 may have a housing for protection, and these two housings may be fixedly connected together by means of bolt, screw, riveting, welding or flange etc. Depending on the shapes of these two housings, the flange may be round or square or in other forms.

As another example, the transmission output shaft of the motor 21 can indirectly and mechanically connected to the transmission input shaft of the plunger pump 11 by a mechanical connection mechanism. The mechanical connecting mechanism may be one of a clutch, a gearbox, an elastic coupling, a transmission shaft, other rigid or flexible couplings or any combination thereof.

In some embodiments, one motor 21 can drive one plunger pump or simultaneously drive a plurality of plunger pumps. The plunger pump 11 may be a multicylinder (e.g., a three-cylinder, a five-cylinder and the like) plunger pump. The plunger pump 11 includes a power end and a fluid end. In the power end, a crankshaft, bearings, gears and the like are contained, and the transmission input shaft of the plunger pump 11 extends outwards from the power end. In the side wall of the fluid end, a fluid end supply port (a liquid inlet) and a fluid end discharge port (a liquid outlet) are provided.

In the example of FIG. 20, it is assumed that the direction of the transmission output shaft of the motor 21 horizontally extending outwards (the direction from the VFAS integrated machine 310 towards the plunger pump 11) is the X direction, the upward direction perpendicular to the X direction is the Y direction, and the direction orthogonal to both the X direction and the Y direction and perpendicular to the sheet inwards is the Z direction.

The electric fracturing device 100*a* may further include a control cabinet 66. In some embodiments, the control cabinet 66 is disposed at one end of the VFAS integrated machine 310 in the −X direction, and the plunger pump 11 is disposed at another end of the VFAS integrated machine 310 in the X direction. The relative positions of the control cabinet 66, the VFAS integrated machine 310 and the plunger pump 11 are not limited to the above, as long as their layout can make the electric fracturing device 100*a* be highly integrated. For example, a fracturing device control system, a VFD control system, a distribution switch cabinet and an auxiliary transformer may be integrally provided in the control cabinet 66. The control cabinet 66 can utilize the fracturing device control system and the VFD control system to control the operation of the electric fracturing device 100*a*, and can utilize the distribution switch cabinet and the auxiliary transformer to distribute the supply power to any electric device in the electric fracturing device 100*a*. On the one hand, the electric power transferred from the power supply facility such as a power supply grid may be directly supplied to the VFAS integrated machine 310, or the electric power may be supplied to the VFAS integrated machine 310 via the distribution switch cabinet in the control cabinet 66 (the electric power has not been processed in the control cabinet 66 yet or after the electric power is processed in the control cabinet 66). On the other hand, the electric power transferred from the power supply facility may be subjected to a voltage adjustment by the above auxiliary transformer, and then be supplied to various auxiliary electric devices in the electric fracturing device other than the VFAS integrated machine. As one example, the auxiliary transformer can output a low voltage of 300V~500V (AC), so as to supply the electric power to auxiliary electric devices such as the lubricating system, the heat dissipation system and the control system in the electric fracturing device 100*a*.

A liquid feeding manifold 34 may be provided at a side of the plunger pump 11 in the −Z direction, and the liquid feeding manifold 34 is communicated with the liquid inlet of the plunger pump 11 and extends outwards from the liquid inlet. An exhaust manifold 33 may be provided at an end portion and/or another end portion of the plunger pump 11 in the X direction and/or −X direction, and the exhaust manifold 33 is communicated with the liquid outlet of the plunger pump 11 and extends outwards from the liquid outlet. The working fluid of the electric fracturing device 100*a* is a fracturing fluid. The prepared fracturing fluid may be supplied to the liquid inlet of the plunger pump 11 via the liquid feeding manifold 34, is pressurized by the movement of the plunger pump 11 and then is exhausted to the exhaust manifold 33 via the liquid outlet of the plunger pump 11, and finally is sent to underground by the exhaust manifold 33 so as to fracture a formation.

<2.3 A Lubricating System of the Electric Fracturing Device>

The electric fracturing device 100*a* may further include a lubricating system for the plunger pump 11, and the lubricating system may include: a lubrication oil box 60; a first lubricating pump and lubricating motor group 61 for pumping the lubrication oil; and a second lubricating pump and lubricating motor group 62 for pumping the lubrication oil. Each of the lubricating motors is used to drive the corresponding lubricating pump.

The lubricating system may be classified into a high-pressure lubricating system and a low-pressure lubricating system, the high-pressure lubricating system applies a lubrication effect on bearings and the like of the power end of the plunger pump 11 by using the lubrication oil from the lubrication oil box 60 for supplying, and the low-pressure lubricating system applies a lubrication effect on gears and the like of the power end of the plunger pump 11 by using the lubrication oil from the lubrication oil box 60. The first lubricating pump and lubricating motor group 61 and the second lubricating pump and lubricating motor group 62 may be respectively used in the high-pressure lubricating system and the low-pressure lubricating system.

The lubrication oil box 60 may be disposed on the support frame 67, and may be located at a side of the VFAS integrated machine 310 in the −Z direction. The lubrication oil box 60 stores the lubrication oil for the high-pressure lubricating system and/or the low-pressure lubricating system. The first lubricating pump and lubricating motor group 61 and the second lubricating pump and lubricating motor group 62 may be provided on the top of the lubrication oil box 60. The disposition positions of each components of the lubricating system in the present disclosure are not limited to the above, and may be located at other positions benefiting the integrated layout of the device.

<2.4 A Heat Dissipation System of the Electric Fracturing Device>

The electric fracturing device 100*a* is provided with a heat dissipation system which may include a lubrication oil heat dissipation system. The lubrication oil heat dissipation system is used for cooling the lubrication oil at the power end of the plunger pump 11, so as to ensure the plunger pump 11 to have a normal operation temperature during the operation process. At least a part of the lubrication oil heat dissipation system may be disposed at the top or side of the plunger pump 11, or may be also disposed at the top or side of the VFAS integrated machine 310.

The lubrication oil heat dissipation system may include: a lubrication oil radiator 59; a heat dissipation fan; and a heat dissipation motor for driving the heat dissipation fan. In the process of performing the lubrication oil heat dissipation, after the lubrication oil enters inside of the lubrication oil radiator 59, the rotation of blades of the heat dissipation fan makes air flow, the air exchanges heat with the lubrication oil inside the lubrication oil radiator 59 so as to reducing the temperature of the lubrication oil, and the lubrication oil with a reduced temperature enters inside of the plunger pump 11 so as to cooling the power end of the plunger pump.

The heat dissipation system of the electric fracturing device 100*a* may further include a coolant heat dissipation system for applying a heat dissipation effect on the VFAS integrated machine 310 and/or the plunger pump 11. At least a part of the coolant heat dissipation system may be disposed at the top or side of the plunger pump 11, or may be also disposed at the top or side of the VFAS integrated machine 310. Since the VFAS integrated machine 310 may generate heat during its operation, it can be cooled by the coolant heat dissipation system using the coolant so as to prevent the fracturing device from being damaged by the heat during a long term working. The coolant heat dissipation system may include: a coolant radiator 63; a cooling pump and cooling motor group 64 for pumping the coolant; a heat dissipation fan; and a heat dissipation motor for driving the heat dissipation fan. The cooling motor is used for driving the cooling pump. The cooling pump may be a vane pump, such as a centrifugal pump, an axial flow pump or a multistage pump and the like. A cooling medium as the coolant may be an antifreeze solution or oil or water.

In some embodiments, when heat dissipation is performed for the VFAS integrated machine 310, it is possible to circulate the cooling medium at inside of the VFAS integrated machine 310 and at inside of the coolant radiator 63 by using the cooling pump and cooling motor group 64. After the cooling medium enters inside of the coolant radiator 63, the rotation of blades of the heat dissipation fan make air flow, the air exchanges heat with the cooling medium at inside of the coolant radiator 63 so as to reduce the temperature of the cooling medium, the cooling medium with a reduced temperature enters inside of the VFAS integrated machine 310 to perform a heat exchange with the VFAS integrated machine 310, so as to reduce the temperature of the VFAS integrated machine 310, and thus a normal operation temperature of the VFAS integrated machine 310 can be ensured.

The coolant heat dissipation system may be replaced by an air cooling mode, and at this time, it needs a heat elimination fan machine and a motor for driving the heat elimination fan machine.

Although in FIG. 20, the lubrication oil radiator 59 is disposed at the side of the plunger pump 11 in the Z direction and the coolant radiator 63 is disposed at the side of the VFAS integrated machine 310 in the −Z direction, as one alternative example, it is possible to arrange the lubrication oil radiator 59 together with the coolant radiator 63 side by side at the side of the VFAS integrated machine 310 in the −Z direction. The disposition positions of components of the heat dissipation system in the present disclosure are not limited to the above, and may be located at other positions benefiting the integrated layout of the device.

<2.5 A Structure of the Electric Fracturing Device Integrated by a Semitrailer>

Figure 21:
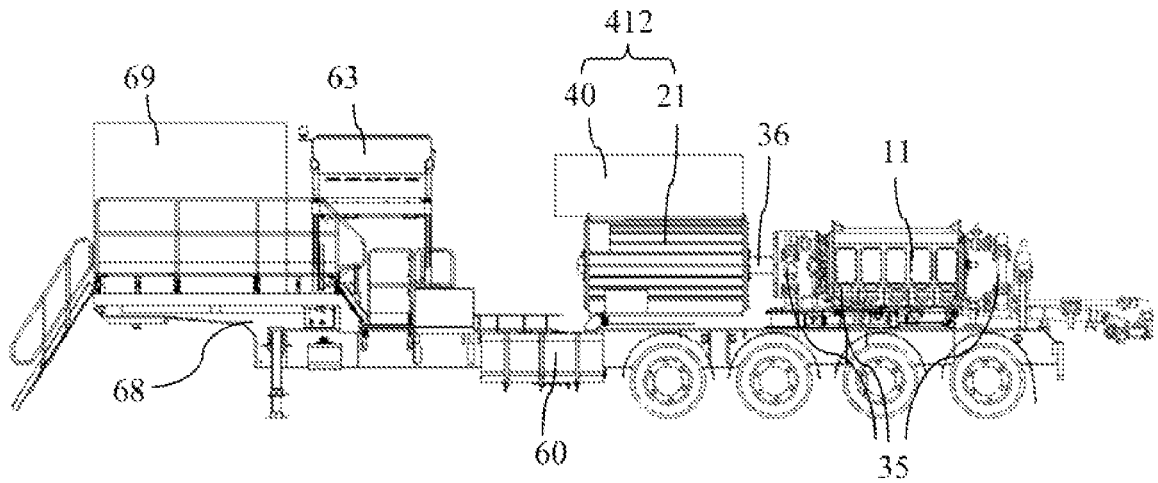
FIG. 21 shows a side view of the integrated layout of the electric fracturing device including the VFAS integrated machine according to a second example of the third embodiment of the present disclosure.
Figure 22:
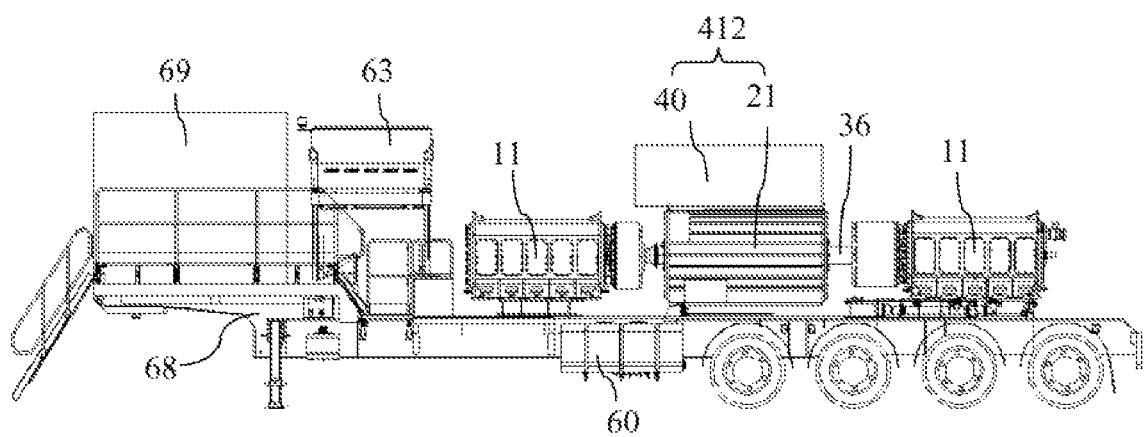
FIG. 22 shows a side view of the integrated layout of the electric fracturing device including the VFAS integrated machine according to a third example of the third embodiment of the present disclosure.

FIG. 21 and FIG. 22 show a side view of the integrated layout of the electric fracturing device including the VFAS integrated machine according to a second and third examples of the third embodiment of the present disclosure.

In the examples of the electric fracturing device 200a and 300a shown in FIG. 21 and FIG. 22, the integration is achieved by a semitrailer 68. A high-voltage and variable-frequency integrated machine 412 and a plunger pump 11 mechanically connected to the high-voltage and variable-frequency integrated machine 412 and driven by the high-voltage variable-frequency integrated machine 412 are integrally installed on the semitrailer 68. The high-voltage and variable-frequency integrated machine 412 includes a VFD 40 and a motor 21 which are integrally installed together. FIG. 21 shows the example in which one high-voltage and variable-frequency integrated machine 412 drives one plunger pump 11. Since the high-voltage and variable-frequency integrated machine provided by the present disclosure has a more compact structure, it is allowed that one integrated electric fracturing device may be provided with at least two sets of single-machine and single-pump structure, or may be provided with one set of single-machine and two-pump structure. FIG. 22 depicts a case where one high-voltage and variable-frequency integrated machine 412 drives a plurality of (e.g., two) plunger pumps 11. The mechanical connection mechanism 36 may be a clutch, a gearbox, a coupling, a transmission shaft or the like, which can achieve the mechanical connection between the high-voltage and variable-frequency integrated machine 412 and any of two plunger pumps 11, and can conveniently detach the plunger pump 11 as necessary.

As some examples, the electric fracturing devices 200a and 300a may further include any one or more of the following: a power distribution cabinet 69, a radiator 63, manifolds 35 (e.g., including the liquid feeding manifold and the exhaust manifold), and a lubrication oil box 60 and the like. The electric fracturing devices 200a and 300a may further include fans, pump and motor groups and the like (not shown) cooperating with each of the radiator 63 and the lubrication oil box 60. The power distribution cabinet 69 may be the control cabinet 66 as shown in FIG. 20. As described above, it is possible that only a portion of the VFD 40 is integrally installed on the motor 21, and other portions of the VFD 40 that are not integrally installed on the motor 21 may be provided in the power distribution cabinet 69.

The integration may be implemented by using a base (a supporting frame or a sleigh) as described above or by using a semitrailer as described herein. Or the integration may be implemented in an on-vehicle manner.

In addition to being applied to the electric fracturing device, the techniques may be applied to an electric pumping device for pumping or driving a downhole tool and an electric cementing device used in a well-cementing process. All of the above lubricating motor, cooling motor, heat dissipation motor and the like may be referred to the auxiliary motor, and the motor for driving the plunger pump may be referred to the main motor. The plunger pump may be replaced with a centrifugal pump, a hydraulic pump and the like. Depending on whether the main motor is directly and mechanically connected or indirectly and mechanically connected, the main motor can achieve an adjustable-speed driving of the plunger pump, the centrifugal pump, the hydraulic pump, the clutch, the gearbox, the coupling, the transmission shaft or the like.

[3. A Well Site Layout Including a Plurality of Electric Fracturing Devices]

Figure 23:
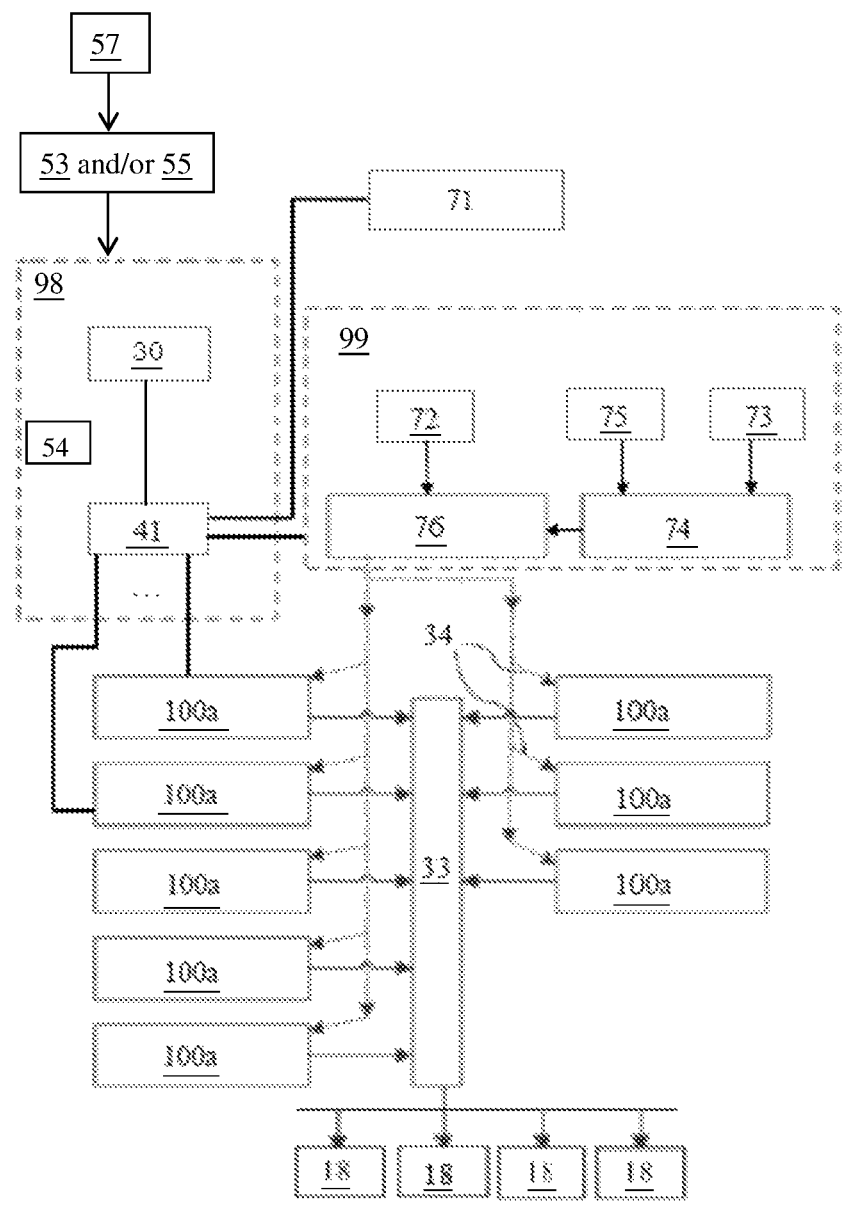
FIG. 23 shows a schematic block diagram of a well site layout including a plurality of electric fracturing devices according to a fourth embodiment of the present disclosure.
Figure 24:
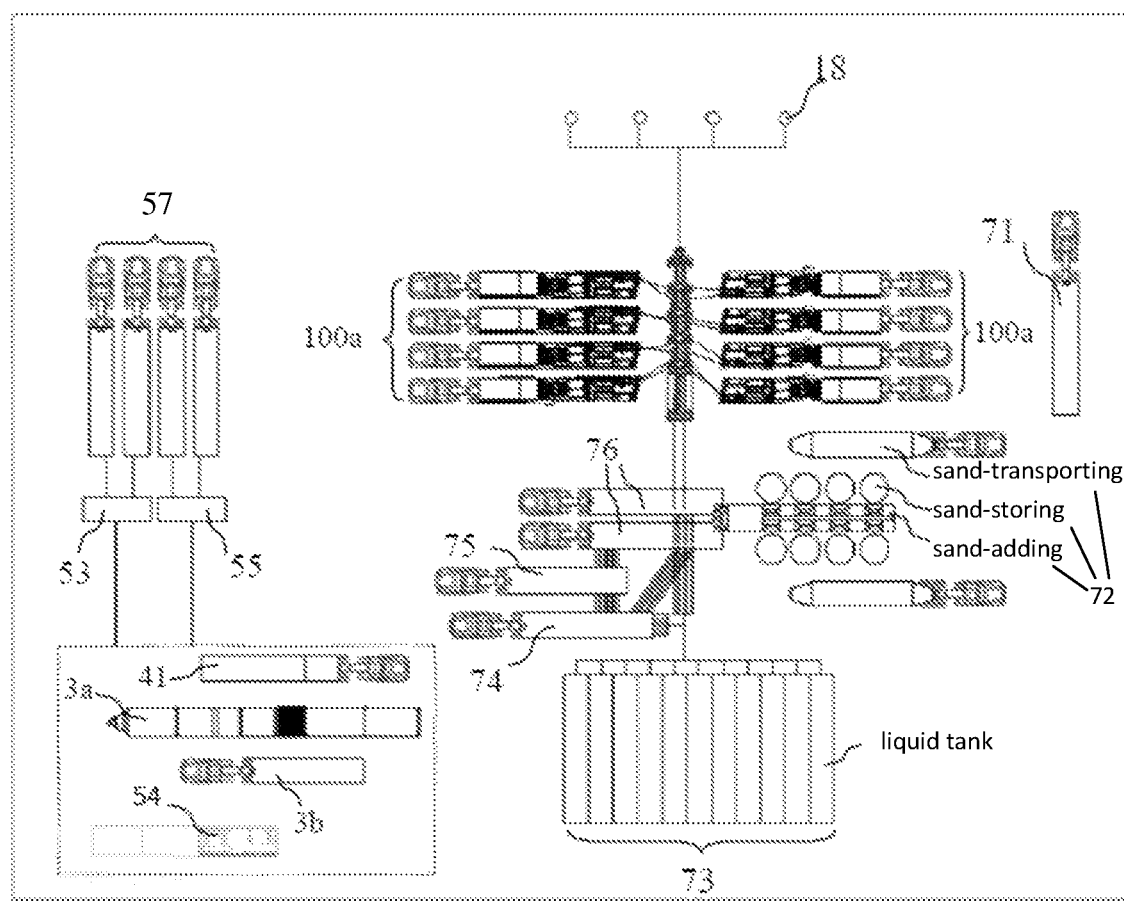
FIG. 24 shows a schematic view of the well site layout including a plurality of electric fracturing devices according to the fourth embodiment of the present disclosure.

FIG. 23 shows a schematic block diagram of a well site layout including a plurality of electric fracturing devices according to a fourth embodiment of the present disclosure. FIG. 24 shows a schematic view of the well site layout including a plurality of electric fracturing devices according to the fourth embodiment of the present disclosure. Each plunger pump 11 in the single electric fracturing device is equipped with the corresponding liquid feeding manifold 34 and exhaust manifold 33 as described with reference to FIG. 20 to FIG. 22, but in the well site layout as shown in FIG. 23 and FIG. 24, a plurality of electric fracturing devices 100a share one exhaust manifold 33. A low-pressure fracturing fluid is inputted to the liquid inlet of the plunger pump of the electric fracturing device 100a via the corresponding liquid feeding manifold 34. After the low-pressure fracturing fluid is pressurized by the plunger pump driven by the main motor, a high-pressure fracturing fluid is obtained, and it is outputted to the shared exhaust manifold 33 via the liquid outlet of the plunger pump, and then is injected to the wellhead 18 via the exhaust manifold 33 so as to enter underground, thereby fracturing the formation of an oil well or a gas well. All of the liquid feeding manifolds 34 and the exhaust manifolds 33 may be integrated on one manifold facility or one group of manifold facilities (e.g., a manifold sleigh, a manifold semitrailer or the like, not shown), so as to be holistically viewed and managed.

In some examples, as shown in FIG. 23, the well site layout further includes a fluid preparation area 99. The fluid preparation area 99 may include a sand blender 76, a sand supplying device (also called a proppant supplying device) 72 and a mixing device 74. If necessary, the fluid preparation area 99 may further include a liquid supplying device 73 and/or a chemical adding device 75. In some cases, the fracturing fluid injected to the wellhole is a sand-carrying liquid, and thus, it is necessary to mix water, sand, chemical additive and the like to make sand grains suspend in the fracturing fluid. The liquid supplying device 73 may directly extract a liquid transported by a transport cart, or may include a plurality of liquid tanks for storing liquid. The liquid such as clean water from the liquid supplying device 73 and the reagent such as the chemical additive from the chemical adding device 75 may be mixed in the mixing device 74 to form a mixed solution (fracturing base fluid), and then the mixed solution and sand from the sand supplying device 72 may enter (generally at different times, and through different inlets) into the sand blender 76 to mix there, so as to form the sand-carrying fracturing fluid needed during operation. The low-pressure fracturing fluid formed by the sand blender 76 is transported to each liquid feeding manifold 34.

In some embodiments, the liquid supplying device 73 and/or the chemical adding device 75 can directly supply the liquid and/or the reagent to the sand blender 76, and in this case, the mixing device 74 may be canceled. In some embodiments, the liquid supplying device 73 and/or the chemical adding device 75 can supply the liquid and/or the reagent to both the mixing device 74 and the sand blender 76 as necessary. That is, if necessary, the sand blender 76 can be communicated with any combination of the sand supplying device 72, the liquid supplying device 73, the mixing device 74 and the chemical adding device 75, and can receive materials supplied from the combination. In some embodiments, the sand supplying device 72, the liquid supplying device 73, the mixing device 74, the chemical adding device 75 and the sand blender 76 as above are not necessarily needed, and their function, number, using mode in combination and layout may be selected and designed according to the specific requirement of the working fluid. At least a part of the functions of the mixing device 74 may be integrated with the sand blender 76. A kind of separately-prepared liquid cement may be transported from a cement delivery tanker to the liquid feeding manifold 34.

The well site layout further includes a power supply area 98. The power supply area 98 may be provided with a power grid, an electric generator, a solar panel, an energy storing device or a combination thereof. In the case where the power supply area 98 contains an electric generator 30 using fuel, the fuel may be a solid fuel, a liquid fuel, a gas fuel or a combination thereof. In this case, the well site layout may further include a transport device 57 for transporting the fuel and a treatment device for treating the fuel. Depending on the source or type of the fuel to be used, the treatment device for treating the fuel may include at least one of a gas fuel (e.g., a compressed natural gas) pressure regulating device 53, a liquid fuel (e.g., a liquified natural gas) gasification device 55 and a fuel (e.g., a wellhead gas or a pipeline gas) purifying device 54. The gas fuel pressure regulating device 53, the fuel purifying device 54 and the liquid fuel gasification device 55 each may be provided inside or outside the power supply area 98.

In some cases, the electric generator 30 may include a main electric generator 3a and an auxiliary electric generator 3b. The main electric generator 3a may supply power to main electric devices in the well site, for example, mainly supplies power to the main motor 21 for driving the plunger pump 11 in the electric fracturing device 100a. The auxiliary electric generator 3b may supply power to auxiliary electric devices in the well site, for example, mainly supplies power to the auxiliary electric devices such as the heat dissipation motor, the lubricating motor and the control system in the electric fracturing device 100a. The number of the main electric generator 3a and the auxiliary electric generator 3b may be not limited to one.

Furthermore, the well site layout may be provided with an instrument 71. In the instrument 71, a remote control system is provided and can remotely control the electric fracturing device 100a, the fluid preparation area 99, the power supply area 98 and the like. The power supply area 98 may include a power distribution device 41. The power distribution device 41 is used for distributing the power from the electric generator 30 to each of the electric fracturing device 100a, the fluid preparation area 99 and the instrument 71. The instrument 71, the fluid preparation area 99 and the like may use the power supplied from the main electric generator 3a. An illuminating system, a sensing system and the like (not shown) may use the power supplied from the auxiliary electric generator 3b.

Although in the well site layout shown in FIG. 24, each electric fracturing device is integrated by using a semitrailer, but it may be integrated by using a sleigh or a support frame. The same is also applicable to other devices, such as the instrument 71, the sand supplying device 72, the liquid supplying device 73, the mixing device 74, the chemical adding device 75, the sand blender 76, the transport device 57, the main electric generator 3a, the auxiliary electric generator 3b and the power distribution device 41.

It should be understood for persons skilled in the art that, it is possible to perform various modification, combination, subcombination and change according to the design requirement and other factors, as long as they fall into the scope of the attached claims or the equivalent thereof

What is claimed is:

1. A variable-frequency drive system comprising:
    a motor;
    a plurality of power cells connected in series and configured to supply electric power from a power supply facility to the motor after the electric power is subjected to voltage regulation and/or frequency conversion, so as to drive the motor to operate with an adjustable speed and generate a driving force;
    cell control circuits provided in a one-to-one correspondence with the power cells to obtain speed regulation information of the power cells and to output a fault information of the power cells; and
    a control panel for communicating with the cell control circuits, outputting an alarm based on the fault information of the cell control circuits, and instructing the cell control circuits to perform a control on the power cells based on an external control instruction.

2. The variable-frequency drive system according to claim 1, wherein,
    the motor is a three-phase motor, and
    each phase of the three-phase motor comprises a branch including the plurality of power cells connected in series.

3. The variable-frequency drive system according to claim 1, wherein,
    each of the power cells includes an inverter unit, and the inverter unit comprises an inverter circuit having a first insulated gate bipolar transistor (IGBT) module inverter circuit.

4. The variable-frequency drive system according to claim 1, further comprising:
    bypass contactors provided in a one-to-one correspondence with the plurality of power cells,
    wherein, when one of the plurality of power cells is in an abnormal state, the power cell in the abnormal state is short-circuited or bypassed by a corresponding bypass contactor.

5. The variable-frequency drive system according to claim 2, further comprising:
    a phase-shifting transformer provided between the power supply facility and the plurality of power cells, so that electric power from the power supply facility is inputted to the plurality of power cells connected in series in different branches with different phases.

6. The variable-frequency drive system according to claim 3, wherein,
    each of the power cells further includes a rectifier unit connected between the power supply facility and the inverter unit.

7. The variable-frequency drive system according to claim 4, further including:
    a bypath power cell,
    wherein the bypath power cell is connected to the plurality of power cells when the power cell in the abnormal state is short-circuited or bypassed by the corresponding bypass contactor.

8. The variable-frequency drive system according to claim 4, wherein,
    the motor is a multi-phase motor, and
    if a first power cell for a first phase of the multi-phase motor is in an abnormal state, the first power cell is bypassed together with one or more power cells for the other phase or phases at position/positions corresponding to that of the first power cell.

9. The variable-frequency drive system according to claim 6, wherein,
the rectifier unit comprises a rectifier circuit having a second IGBT module.

10. The variable-frequency drive system according to claim 6, wherein,
each of the power cells further includes: a filtering unit connected between the rectifier unit and the inverter unit.

11. The variable-frequency drive system according to claim 7, wherein,
the motor is a multi-phase motor, and
if a first power cell for a first phase of the multi-phase motor is in an abnormal state, the first power cell is bypassed together with one or more power cells for the other phase or phases at position/positions corresponding to that of the first power cell.

12. A pumping system comprising:
a motor;
a plurality of power cells connected in series and configured to supply electric power from a power supply facility to the motor after the electric power is subjected to voltage regulation and/or frequency conversion, so as to drive the motor to operate with an adjustable speed and generate a driving force; and
an electrically-driven working apparatus, wherein electrically-driven working apparatus includes a plunger pump that is connected to the motor and receives the driving force from the motor, so that the plunger pump pressurizes a working fluid and outputs the pressurized working fluid to work.

13. The pumping system according to claim 12, wherein,
the plunger pump is integrally installed together with the motor on a sleigh, a support frame, or a semitrailer.

14. The pumping system according to claim 12, wherein,
the motor is directly connected to the plunger pump, or
the motor is indirectly connected to the plunger pump via a mechanical connection mechanism.

15. The pumping system according to claim 12, further comprising:
a control system configured to give an alarm and issue a control instruction for managing the power cells when one of the plurality of power cells is in an abnormal state, and output an alarm information.

16. A well site layout comprising:
the pumping system according to claim 12;
a sand blender communicating with a liquid inlet of the plunger pump;
a sand supplying device for supplying sand to the sand blender; and
a liquid supplying device for supplying liquid to the sand blender,
wherein the sand blender mixes the sand from the sand supplying device and the liquid from the liquid supplying device to obtain a working fluid.

17. The well site layout according to claim 16, further comprising:
a mixing device communicating with the sand blender; and
a chemical adding device for supplying a chemical additive to the sand blender,
wherein the liquid from the liquid supplying device and the chemical additive from the chemical adding device are mixed by the mixing device and then supplied to the sand blender.

18. The well site layout according to claim 16, comprising:
a plurality of electrically-driven working apparatuses, a plunger pump of each of the electrically-driven working apparatuses is respectively equipped with a liquid feeding manifold, and the plunger pumps of the electrically-driven working apparatuses share an exhaust manifold communicating with a wellhead, and
the liquid feeding manifolds and the exhaust manifold are integrated on at least one manifold facility.

* * * * *